United States Patent
Geyer et al.

(10) Patent No.: US 12,145,811 B2
(45) Date of Patent: Nov. 19, 2024

(54) SYSTEMS AND METHODS FOR CONTROLLING THE DISGORGING OF OBJECTS IN CONTAINERS BY VIBRATORY MOTION

(71) Applicant: Berkshire Grey Operating Company, Inc., Bedford, MA (US)

(72) Inventors: Christopher Geyer, Arlington, MA (US); Joseph Romano, Arlington, MA (US); Matthew T. Mason, Pittsburgh, PA (US); Alexander Paxson, Acton, MA (US); John Richard Amend, Jr., Belmont, MA (US); Thomas Wagner, Concord, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 414 days.

(21) Appl. No.: 17/583,528

(22) Filed: Jan. 25, 2022

(65) Prior Publication Data
US 2022/0144561 A1    May 12, 2022

Related U.S. Application Data

(63) Continuation of application No. 16/802,817, filed on Feb. 27, 2020, now Pat. No. 11,267,662.
(Continued)

(51) Int. Cl.
*B65G 65/23* (2006.01)
*B65B 69/00* (2006.01)
(Continued)

(52) U.S. Cl.
CPC ............ *B65G 65/23* (2013.01); *B65B 69/005* (2013.01); *B65G 47/1421* (2013.01);
(Continued)

(58) Field of Classification Search
CPC .................................................... B65G 65/23
See application file for complete search history.

(56) References Cited

U.S. PATENT DOCUMENTS

| 4,363,589 A | 12/1982 | Rozwadowski et al. |
| 4,776,742 A | 10/1988 | Felder |
(Continued)

FOREIGN PATENT DOCUMENTS

| CA | 2795022 A1 | 10/2011 |
| CN | 1164834 A | 11/1997 |
(Continued)

OTHER PUBLICATIONS

Notice on the Third Office Action, along with its English translation, issued by the China National Intellectual Property Administration in related Chinese Patent Application No. 202080012388.0 on Jun. 5, 2023, 8 pages.
(Continued)

*Primary Examiner* — Jonathan Snelting
(74) *Attorney, Agent, or Firm* — Gesmer Updegrove LLP

(57) ABSTRACT

A system is disclosed for controlling the disgorging of objects. The system includes a container system including a container for containing objects, rotation means for rotating the container to a disgorgement angle, and movement means for moving at least a portion of the container system in a repetitious manner with a net zero distance of travel of the at least the portion of the container system such that the objects are disgorged from the container at a controlled rate of disgorgement.

30 Claims, 22 Drawing Sheets

Related U.S. Application Data

(60) Provisional application No. 62/811,306, filed on Feb. 27, 2019.

(51) Int. Cl.
  B65G 47/14    (2006.01)
  B65G 47/42    (2006.01)

(52) U.S. Cl.
  CPC ...... B65G 47/42 (2013.01); *B65G 2203/0225* (2013.01); *B65G 2203/041* (2013.01)

(56) References Cited

U.S. PATENT DOCUMENTS

| | | | |
|---|---|---|---|
| 4,802,810 A | 2/1989 | Gunn | |
| 4,832,553 A | 5/1989 | Grey | |
| 5,352,081 A | 10/1994 | Tanaka | |
| 5,460,271 A | 10/1995 | Kenny et al. | |
| 5,473,703 A * | 12/1995 | Smith | G06M 11/00 221/200 |
| 5,685,687 A | 11/1997 | Frye | |
| 6,079,570 A | 6/2000 | Oppliger et al. | |
| 6,131,372 A | 10/2000 | Pruett | |
| 6,208,908 B1 | 3/2001 | Boyd et al. | |
| 6,543,983 B1 | 4/2003 | Felder et al. | |
| 6,685,031 B2 | 2/2004 | Takizawa | |
| 6,698,990 B1 | 3/2004 | Dobner et al. | |
| 7,399,383 B2 | 7/2008 | Giovinazzo | |
| 8,972,049 B2 | 3/2015 | Tidhar et al. | |
| 8,997,438 B1 | 4/2015 | Fallas | |
| 9,038,828 B2 | 5/2015 | Enenkel | |
| 9,415,949 B2 | 8/2016 | Buse | |
| 9,637,261 B2 | 5/2017 | Monti | |
| 9,694,977 B2 | 7/2017 | Aprea et al. | |
| 9,821,464 B2 | 11/2017 | Stiernagle et al. | |
| 9,911,246 B1 | 3/2018 | McBride et al. | |
| 9,931,673 B2 | 4/2018 | Nice et al. | |
| 9,962,743 B2 | 5/2018 | Bombaugh et al. | |
| 9,975,148 B2 | 5/2018 | Zhu et al. | |
| 10,007,827 B2 | 6/2018 | Wagner et al. | |
| 10,438,034 B2 | 10/2019 | Wagner et al. | |
| 10,538,394 B2 | 1/2020 | Wagner et al. | |
| 10,576,621 B2 | 3/2020 | Wagner et al. | |
| 10,611,021 B2 | 4/2020 | Wagner et al. | |
| 10,625,934 B2 | 4/2020 | Mallady | |
| 2002/0134056 A1 | 9/2002 | Dimario et al. | |
| 2002/0159870 A1 | 10/2002 | Pruteanu et al. | |
| 2002/0170850 A1 | 11/2002 | Bonham et al. | |
| 2003/0006122 A1 | 1/2003 | Street et al. | |
| 2003/0029946 A1 | 2/2003 | Lieber et al. | |
| 2003/0042112 A1 | 3/2003 | Woerner et al. | |
| 2003/0135300 A1 | 7/2003 | Lewis | |
| 2004/0144618 A1 | 7/2004 | McDonald et al. | |
| 2005/0002772 A1 | 1/2005 | Stone | |
| 2005/0115787 A1 | 6/2005 | Kraus | |
| 2005/0220600 A1 | 10/2005 | Baker et al. | |
| 2005/0269364 A1 | 12/2005 | Gibson | |
| 2006/0104803 A1 | 5/2006 | Wanninger et al. | |
| 2006/0153667 A1 | 7/2006 | Pruteanu et al. | |
| 2008/0269960 A1 | 10/2008 | Kostmann | |
| 2009/0074545 A1 | 3/2009 | Lert, Jr. et al. | |
| 2011/0144798 A1 | 6/2011 | Freudelsperger | |
| 2013/0334158 A1 | 12/2013 | Koch | |
| 2014/0244026 A1 | 8/2014 | Neiser | |
| 2014/0249666 A1 | 9/2014 | Radwallner et al. | |
| 2014/0277693 A1 | 9/2014 | Naylor | |
| 2015/0346708 A1 | 12/2015 | Mattern et al. | |
| 2015/0352717 A1 | 12/2015 | Mundt et al. | |
| 2015/0352721 A1 | 12/2015 | Wicks et al. | |
| 2015/0360882 A1 | 12/2015 | Girtman | |
| 2016/0264366 A1 | 9/2016 | Heitplatz | |
| 2017/0073175 A1 | 3/2017 | Wicks et al. | |
| 2017/0197233 A1 | 7/2017 | Bombaugh et al. | |
| 2017/0305694 A1 | 10/2017 | McMurrough et al. | |
| 2018/0057264 A1 | 3/2018 | Wicks et al. | |
| 2018/0127219 A1 | 5/2018 | Wagner et al. | |
| 2018/0148272 A1 | 5/2018 | Wagner et al. | |
| 2018/0265291 A1 | 9/2018 | Wagner et al. | |
| 2018/0265298 A1 | 9/2018 | Wagner et al. | |
| 2018/0265311 A1 | 9/2018 | Wagner et al. | |
| 2018/0273295 A1 | 9/2018 | Wagner et al. | |
| 2018/0273296 A1 | 9/2018 | Wagner et al. | |
| 2018/0273297 A1 | 9/2018 | Wagner et al. | |
| 2018/0273298 A1 | 9/2018 | Wagner et al. | |
| 2018/0282065 A1 | 10/2018 | Wagner et al. | |
| 2018/0282066 A1 | 10/2018 | Wagner et al. | |
| 2018/0312336 A1 | 11/2018 | Wagner et al. | |
| 2018/0327198 A1 | 11/2018 | Wagner et al. | |
| 2018/0330134 A1 | 11/2018 | Wagner et al. | |
| 2018/0354717 A1 | 12/2018 | Lindbo et al. | |
| 2019/0021956 A1 | 1/2019 | Geltser et al. | |
| 2019/0337723 A1 | 11/2019 | Wagner et al. | |
| 2020/0005005 A1 | 1/2020 | Wagner et al. | |
| 2020/0143127 A1 | 5/2020 | Wagner et al. | |
| 2020/0270076 A1 | 8/2020 | Geyer et al. | |
| 2021/0221618 A1 | 6/2021 | Austrheim | |

FOREIGN PATENT DOCUMENTS

| | | |
|---|---|---|
| CN | 1597471 A | 3/2005 |
| CN | 101998923 A | 3/2011 |
| CN | 102159307 A | 8/2011 |
| CN | 103129783 A | 6/2013 |
| CN | 203392515 U | 1/2014 |
| CN | 103884851 A | 6/2014 |
| CN | 104093650 A | 10/2014 |
| CN | 106395405 A | 2/2017 |
| CN | 106629098 A | 5/2017 |
| CN | 108861651 A | 11/2018 |
| CN | 113382940 A | 9/2021 |
| CN | 117509204 A | 2/2024 |
| DE | 3124537 C1 | 2/1983 |
| DE | 10133805 B4 | 9/2005 |
| DE | 102007024670 A1 | 12/2008 |
| DE | 102009050901 A1 | 4/2011 |
| DE | 102014111396 A1 | 2/2016 |
| EP | 0512261 A1 | 11/1992 |
| EP | 0648695 A2 | 4/1995 |
| EP | 2493766 A1 | 9/2012 |
| EP | 3000773 A1 | 3/2016 |
| EP | 3006379 A2 | 4/2016 |
| EP | 3112295 A1 | 1/2017 |
| FR | 2784666 A1 | 4/2000 |
| GB | 2507707 A | 5/2014 |
| JP | S5442774 A | 4/1979 |
| JP | S57126307 U | 8/1982 |
| JP | S63310406 A | 12/1988 |
| JP | H01220642 A | 9/1989 |
| JP | H0647726 A | 2/1994 |
| JP | H0769470 A | 3/1995 |
| JP | H07196167 A | 8/1995 |
| JP | H10007226 A | 1/1998 |
| JP | 2000142948 A | 11/1998 |
| JP | 2002028577 A | 1/2002 |
| NL | 1009406 C2 | 12/1999 |
| WO | 3074201 A1 | 9/2003 |
| WO | 2007009136 A1 | 1/2007 |
| WO | 2008091733 A2 | 7/2008 |
| WO | 2011051189 A1 | 5/2011 |
| WO | 2020176706 A1 | 9/2020 |

OTHER PUBLICATIONS

Notice on the Second Office Action issued by the China National Intellectual Property Administration in related Chinese Patent Application No. 202080012388.0 on Jan. 19, 2023, 38 pages.

Examiner's Report issued by the Innovation, Science and Economic Development Canada (Canadian Intellectual Property Office) in related Canadian Patent Application No. 3,130,153 on Jan. 4, 2023, 5 pages.

Notice on the First Office Action issued by the China National Intellectual Property Administration in related Chinese Patent Application No. 202080012388.0 on Jul. 19, 2022, 36 pages.

(56) References Cited

OTHER PUBLICATIONS

Examiner's Report issued by the Innovation, Science and Economic Development Canada (Canadian Intellectual Property Office) in related Canadian Patent Application No. 3,130,153 on Dec. 7, 2023, 3 pages.
Communication pursuant to Article 94(3) EPC issued by the European Patent Office in related European Patent Application No. 20715558.1 on Mar. 1, 2023, 4 pages.
Communication pursuant to Rules 161(1) and 162 EPC issued by the European Patent Office in related European Patent Application No. 20715558.1 on Oct. 5, 2021, 3 pages.
International Preliminary Report on Patentability issued by the International Bureau of WIPO in related International Application No. PCT/US2020/020035 on Aug. 25, 2021, 7 pages.
International Search Report and Written Opinion of the International Searching Authority issued in related International Application No. PCT/US2020/020035 on Jun. 5, 2020, 11 pages.
Non-Final Office Action issued by the United States Patent and Trademark Office in related U.S. Appl. No. 16/802,817, filed May 28, 2021, 11 pages.
Tanaka et al., JP 01-220642. 1989. English language machine translation. Retrieved May 26, 2021 form Espacenet. (Year: 1989).
Extended European Search Report issued by the European Patent Office in related European Patent Application No. 24186446.1 on Sep. 3, 2024, 7 pages.

\* cited by examiner

SYSTEMS AND METHODS FOR CONTROLLING THE DISGORGING OF OBJECTS IN CONTAINERS BY VIBRATORY MOTION

PRIORITY

The present application is a continuation application of U.S. patent application Ser. No. 16/802,817, filed Feb. 27, 2020, now U.S. Pat. No. 11,267,662, issued Mar. 8, 2022, which claims priority to U.S. Provisional Patent Application Ser. No. 62/811,306, filed Feb. 27, 2019, the disclosures of which are hereby incorporated by reference in their entireties.

BACKGROUND

The invention generally relates to programmable motion control systems whose task is to move objects from one location to another, and relates in particular to programmable motion control systems intended for use in environments requiring, for example, that a variety of objects (e.g., products, articles, parcels, packages, etc.) be sorted and/or distributed to any of several output destinations.

The invention relates, in particular, to automated material handling applications in which containers of objects of varying sizes and shapes need to be emptied of their contents and then processed in an orderly fashion. Such a container may be a bulk container also known as a Gaylord container, for example, which might contain boxes or packages of varying sizes. Frequently such kinds of bulk containers are emptied by human workers that simply tip them over to empty the contents. If the contents of the bulk container are fragile, then this approach is often inadequate. As the bulk container is tipped over, it creates an avalanche of goods that can crush items at the bottom of the avalanche.

The emptying of such containers is an important step, in many object distribution systems that receive objects in a disorganized fashion, yet need to provide that the objects are then processed in a more orderly fashion. After being removed from such a container, each object must then be processed and distributed to a correct destination location, as determined by identification information associated with the object, which is commonly determined by a label printed on the object or on a sticker on the object. Routes to the destination location may involve routing the object to an intermediate location that may take many forms, such as a bag or a bin.

The process of sorting these objects for example, has traditionally been done by hand. A human sorter picks an object from an incoming bin, finds a barcode on the object, scans the barcode with a handheld barcode scanner, determines from the scanned barcode the appropriate bin or shelf location for the article, and then places the article in the so-determined bin or shelf location where all objects for that order have been defined to belong. Automated systems for order fulfillment have also been proposed. See for example, U.S. Patent Application Publication No. 2014/0244026, which discloses the use of a robotic arm together with an arcuate structure that is movable to within reach of the robotic arm.

Many current distribution center sorting systems generally assume an inflexible sequence of operations whereby a disorganized stream of input objects is first singulated into a single stream of isolated objects presented one at a time to a scanner that identifies the object. An induction element or elements (e.g., a conveyor, a tilt tray, or manually movable bins) transport the objects to the desired destination or further processing station, which may be a bin, a chute, a bag or a conveyor etc.

In conventional parcel sortation systems, human workers or automated systems may retrieve objects from a disorganized grouping on objects, and sort each object into a collection bin based on a set of given heuristics. For instance, all objects of like type might go to a collection bin, or all objects in a single customer order, or all objects destined for the same shipping destination, etc. The human workers or automated systems are required to receive objects and to move each to their assigned collection bin. If the number of different types of input (received) objects is large, a large number of collection bins is required.

Unfortunately, these systems don't address the limitations of requiring human personnel to handle (e.g., process by picking) the objects into a singulated stream of objects so that the objects may be processed by manual or automated systems. There remains a need for a more efficient and more cost effective object processing systems that distribute objects of a variety of sizes and weights into a singulated stream of objects, yet is efficient in handling an influx of disorganized objects of such varying sizes and weights.

SUMMARY

In accordance with an aspect, the invention provides a system for controlling the disgorging of objects. The system includes a container system including a container for containing objects, rotation means for rotating the container to a disgorgement angle, and movement means for moving at least a portion of the container system in a repetitious manner with a net zero distance of travel of the at least the portion of container system such that the objects are disgorged from the container at a controlled rate of disgorgement.

In accordance with another aspect, the invention provides a system for controlling the disgorging of objects from a container. The system includes a container receiving system for receiving the container of objects at a lift and rotate mechanism, said lift and rotate mechanism being adapted to lift the container and to rotate the container to a disgorgement angle, and movement means for moving at least a portion of the lift and rotate mechanism in a repetitious manner with a net zero distance of travel of the at least the portion of lift and rotate mechanism such that objects are disgorged from the container at a controlled rate of disgorgement.

In accordance with a further aspect, the invention provides a method for controlling the disgorging of objects. The method includes providing a container system including a container for containing objects, rotating the container to a disgorgement angle, and moving at least a portion of the container system in a repetitious manner with a net zero distance of travel of the at least the portion of the container such that said objects are disgorged from the container at a controlled rate of disgorgement.

BRIEF DESCRIPTION OF THE DRAWINGS

The following description may be further understood with reference to the accompanying drawings in which.

The drawings are shown for illustrative purposes only.

DETAILED DESCRIPTION

In accordance with an embodiment, the invention provides an approach to safely disgorging contents of objects from containers as a stream of objects, with less damage than a simple tipping approach. In order to deliver packages without damage in the action of tipping a container, it is important that packages and boxes do not fall uncontrollably out of the container. In accordance with certain applications, the invention provides a system that empties a bulk container filled with packages by tipping the container over but then vibrating the restrained container back and forth. The container is tipped to a slope before which the packages slide out uncontrollably—as used herein, the slope at which sliding starts, is the slope of incipient slip, and the angle is referred to as the incipient angle. Instead of tipping the container beyond the slope of incipient slip, the tipper vibrates in an oscillatory motion whose net effect in the lateral direction is a back and forth in the direction of the sliding. The action of vibrating induces controllable slipping. When the tipper stops vibrating, sliding motion stops because the kinetic friction rapidly dampens the motion to resting. When the tipper vibrates, it imparts a velocity and momentum on the packages that causes them to momentarily exceed the static friction forces that keep the packages from sliding.

In accordance with certain aspects, the invention provides a strategy and mechanism for emptying containers, and combines tipping and shaking to empty the contents of the container. In certain aspects, the system firmly retains a container so that it may be both tipped and shaken. The firmness provides that there is transmission of a vibratory motion to the container itself, and that in particular the surface of the interior of the container vibrates underneath the contained items. The system may also automatically adjust to the size of the container and/or the objects within the container as discussed below.

Figure 1:
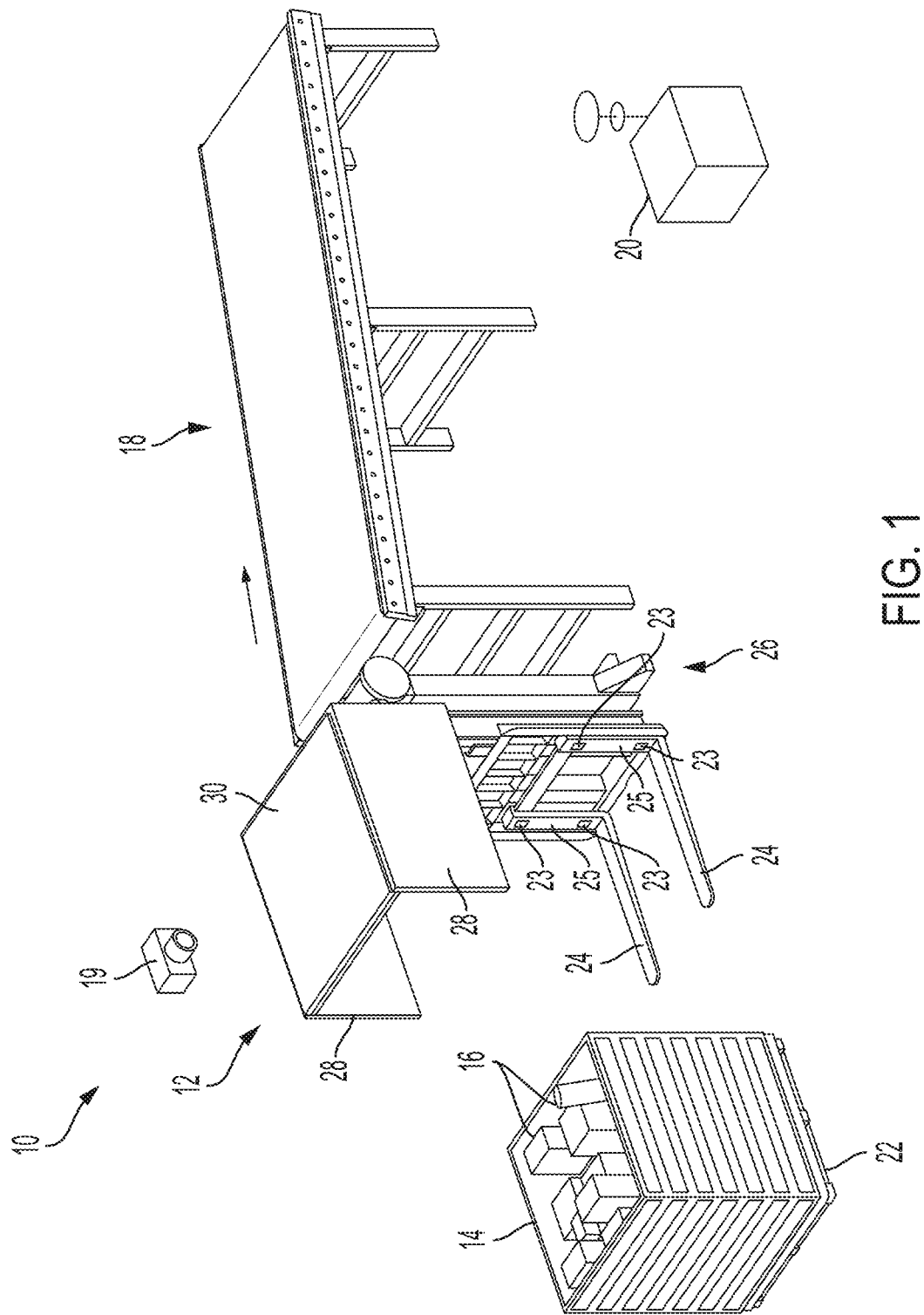
FIG. 1 shows an illustrative diagrammatic view of disgorgement system in accordance with an embodiment of the present invention.
Figure 2:
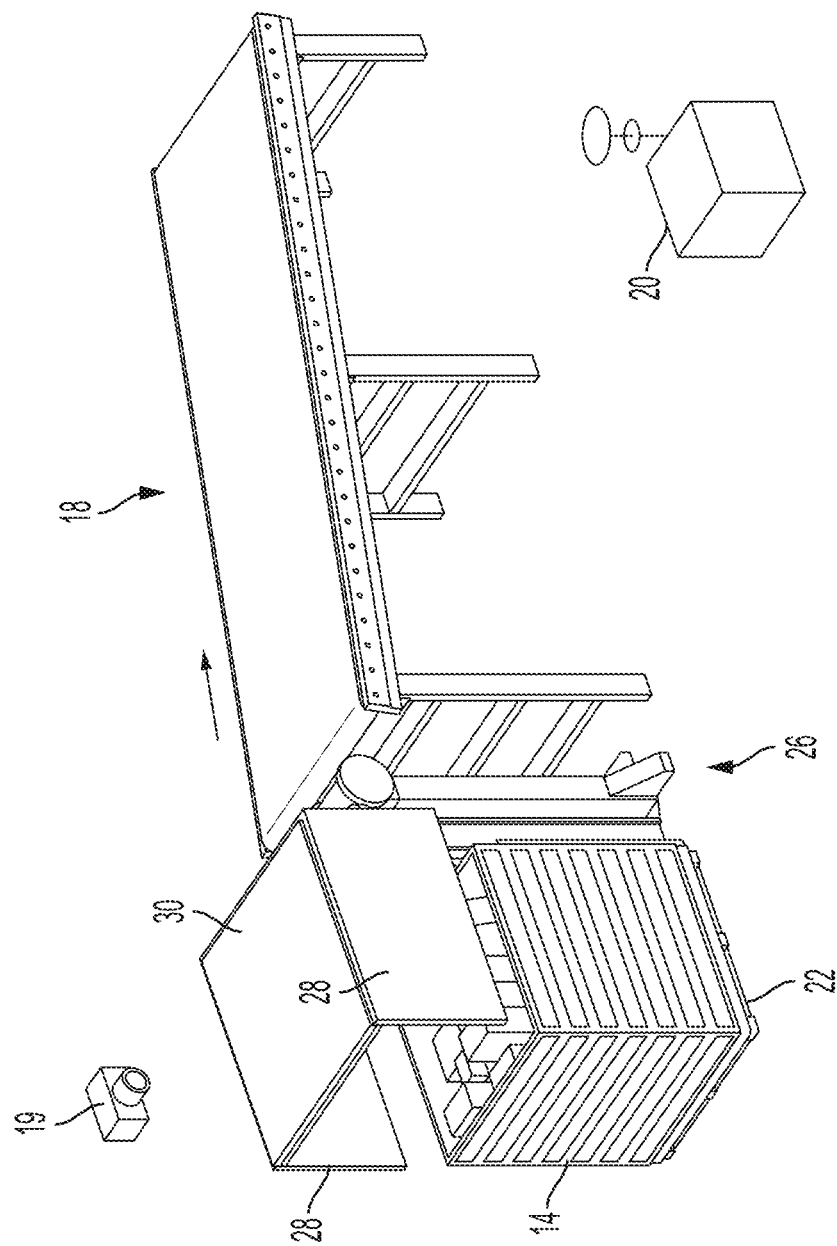
FIG. 2 shows an illustrative diagrammatic view of the system of FIG. 1 with the container engaged by the container handling system.
Figure 3:
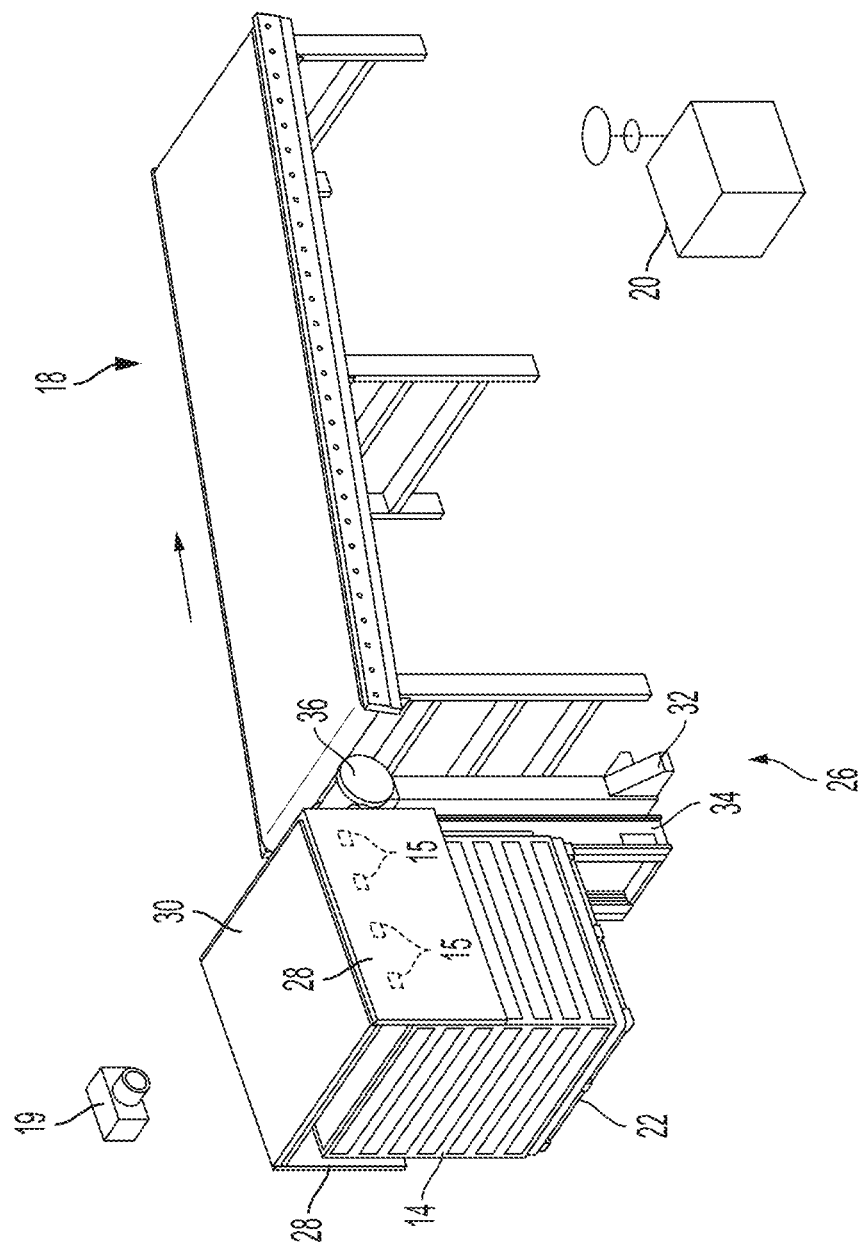
FIG. 3 shows an illustrative diagrammatic view of the system of FIG. 1 with the container handling system lifting the container.

FIG. 1, for example, shows a processing system 10 that includes a container system 12 that may receive a container 14 containing objects 16, and lift and dump the objects onto a conveyor system 18 under the control of one or more processing systems 20. In particular, the container 14 may include a pallet base 22 that may receive lift forks tongs 24 of a container handling system 26 of an aspect of the present invention. The lift fork tongs 24 are maintained slightly off the floor (ground) so that the pallet base 22 may be slid onto the tongs 24. Alternatively, the tongs 24 may be angled on the bottom such that the free ends of the tongs rest above the floor. Further, the thickest part of the lift fork tongs 24 may be the same thickness as (or slightly larger than) the opening within the pallet base 22 into which the tongs 24 are inserted. The container handling system 26 includes guide sides 28 as well as a hinged top 30. FIG. 2 shows the container 14 having been engaged onto the tongs 24, and FIG. 3 shows the container being lifted by the container handling system 26.

Figure 4:
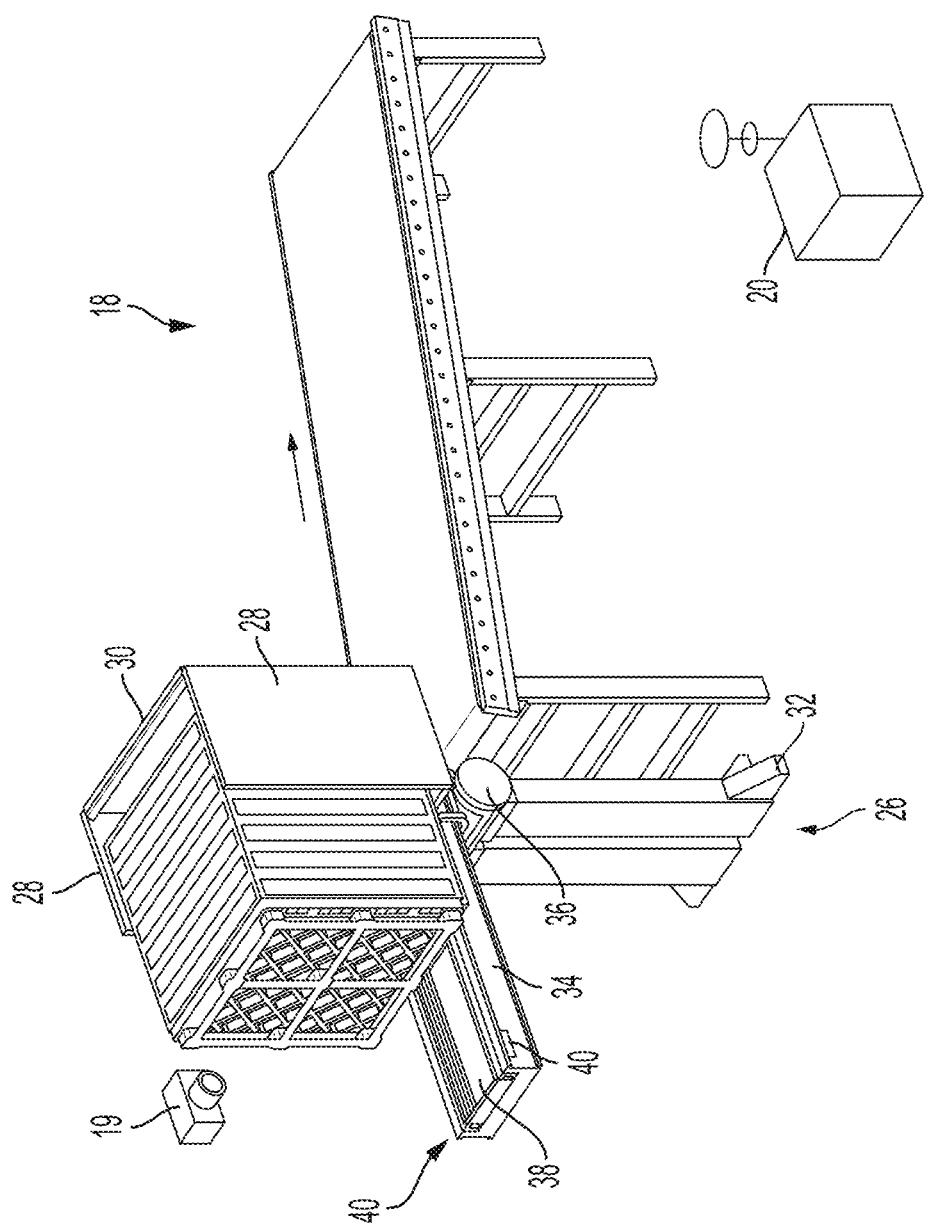
FIG. 4 shows an illustrative diagrammatic view of the system of FIG. 1 with the container handling system tilting the container onto a conveyor system.

As shown in FIG. 4, the container handling system 26 includes a base 32 and a lift arm 34. Not only does the lift arm 34 lift the container upward (as shown in FIG. 3), the lift arm 34 is also rotatable by motor 36 to tip the container such that one side is horizontal. The hinged top 30 may either hang straight down, or in certain aspects, may be actively closed to ensure that objects remain contained within the container at this time. The motor 36 may further include a force torque sensor, whereby the weight of the contents of the container may be determined. In particular, the tongs 24 are mounted to and moved up and down by a central actuator 38 that includes lift sections 25 that lift the tongs 24, as well as a vibration actuator 40 that selectively causes the central actuator 38 to vibrate with respect to the remaining portions of the container handling system 26. The lift sections 25 further include load cells or force torque sensors 23 (shown in FIG. 1), that, when the container is lifted to be horizontal as shown in FIG. 4, may be used to determine the total weight of the objects 16 as well as the container 14 and pallet base 22. Knowing weight of the container 14 and the pallet base 22, permits the system to determine the weight of the total set of the objects 16 within the container 14.

Figure 5A:
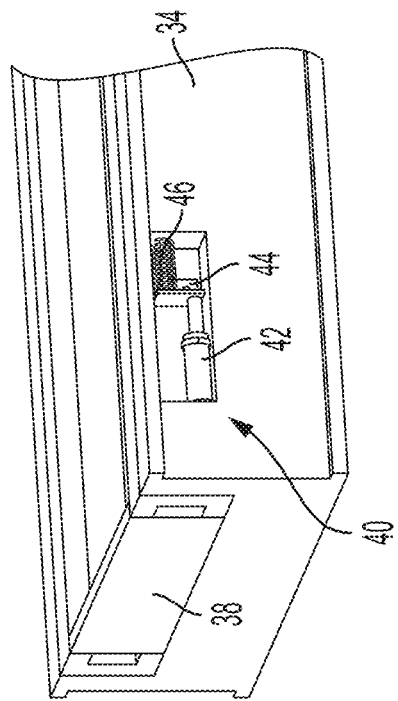
FIGS. 5A and 5B show illustrative diagrammatic side views of a vibration actuator for use in a system in accordance with an aspect of the invention that includes a linear actuator.
Figure 5B:
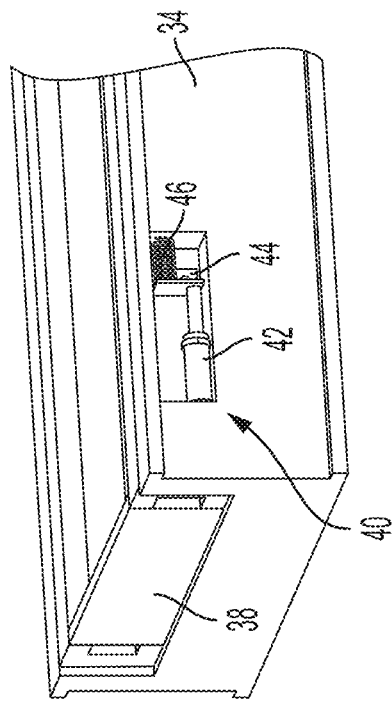
Figure 6A:
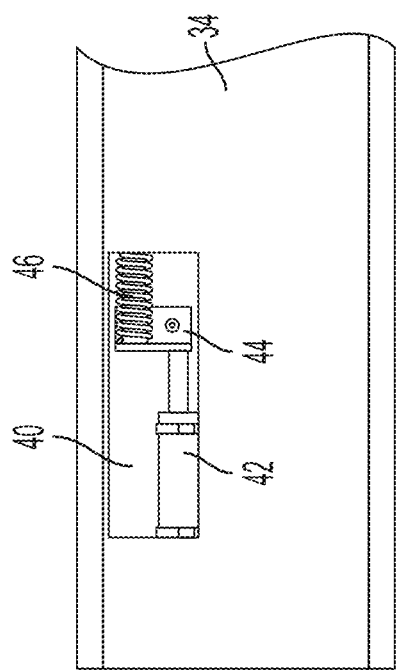
FIGS. 6A and 6B show illustrative diagrammatic isometric views of the vibration actuator of FIGS. 5A and 5B showing the central actuator.
Figure 6B:
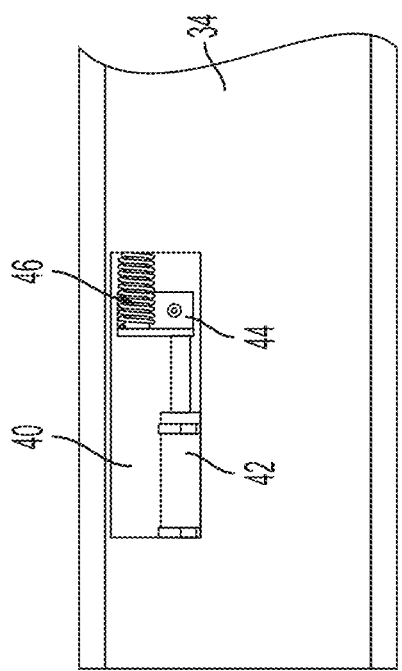

FIGS. 5A and 5B show side views of a vibration actuator 40 in accordance with an aspect of the present invention, and FIGS. 6A and 6B show isometric views of the vibration actuator 40 and the lift arm 34. The vibration actuator 40 includes a bracket 44 that is attached to the central actuator 38, as well as a piston or solenoid 42 that acts on the bracket 44, and an optional return spring 46 that urges the piston or solenoid 42 to a return position. In certain aspects, the piston or solenoid 42 may be reversibly activated.

The vibration actuators (e.g., when two or four are used) may be employed in unison to provide a specific vibration pattern as discussed below. Additionally, the pattern (or two or more patterns) may be swept through a range of frequencies, while the system monitors (e.g., via a detection system 19 such as a camera, or via the load cells or force torque sensors 23) vibratory motion of the container. In this way, the frequency at which the container appears to be most resonant may be determined. This information may provide significant information regarding the container's contents, including for example, the total weight of and/or the number of objects within the container.

Figure 7A:
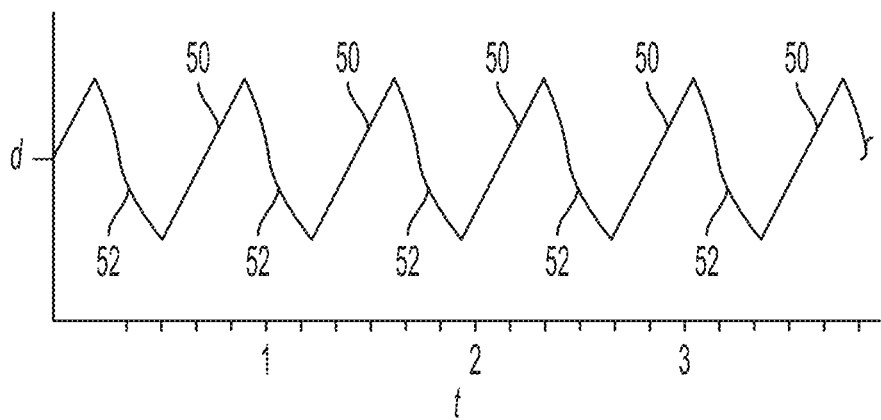
FIGS. 7A-7C show illustrative graphical representations of vibratory motion patterns in a system in accordance with various aspects of the invention.
Figure 7B:
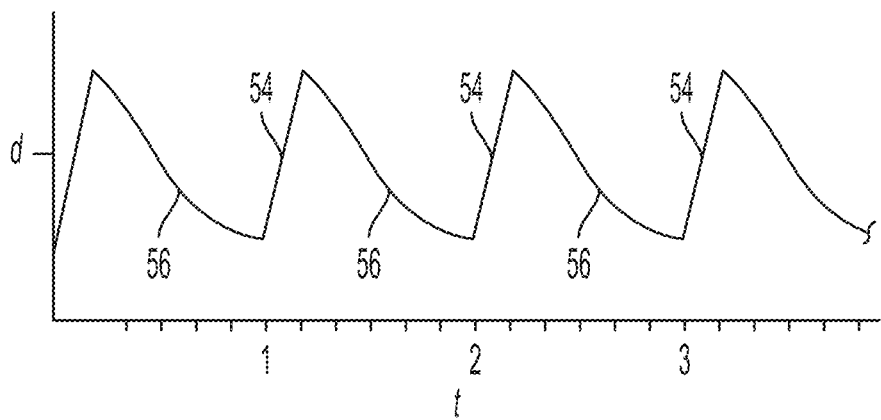
Figure 7C:
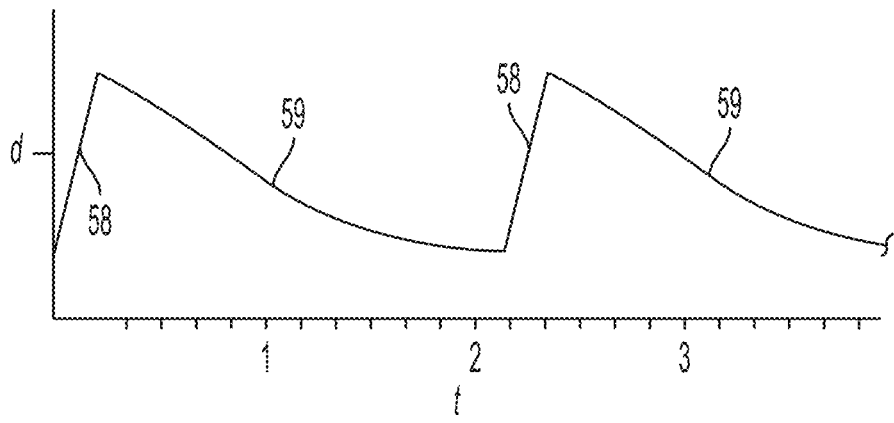

FIGS. 7A-7C show different representations of vibration motion patterns of the bracket 44 (and therefore the central actuator 38) over time. In the system vibration shown in FIG. 7A, the piston or solenoid 42 acts against the bracket 44 as shown at 50, and the return spring 46 acts against the bracket 44 as shown at 52. The net distance of movement of the bracket is zero, but the bracket is effectively vibrated, which causes the central actuator 38 and the container to vibrate, which in turn causes the objects 16 within the container to slide. The vibratory motion may have a roughly 50% duty cycle as shown in FIG. 7A.

The duty cycle of the vibratory motion may, in certain aspects, be varied. FIG. 7B shows at 54 the movement of the bracket acted upon by the piston or solenoid 42, and shows at 56 the movement of the bracket acted upon by the return spring 46. The duty cycle of the movement of the piston or solenoid is much less than 50% (is about 16.5%). FIG. 7C shows at 58 the movement of the bracket acted upon by the piston or solenoid 42, and shows at 59 the movement of the bracket acted upon by the return spring 46. The duty cycle of the movement of the piston or solenoid here is about 7.5%. A potential effect of varying the duty cycle in such a way is that the quick motion, when combined with a much slower return motion, may serve to cause objects within the container to move within the container in either direction. In other words, the objects may move with the container when moved slowly, but may slip with respect to the container when the container is moved quickly. This principal may be used to walk objects either out of the container, or to retain them within the container to slow their disgorgement.

Figure 8:
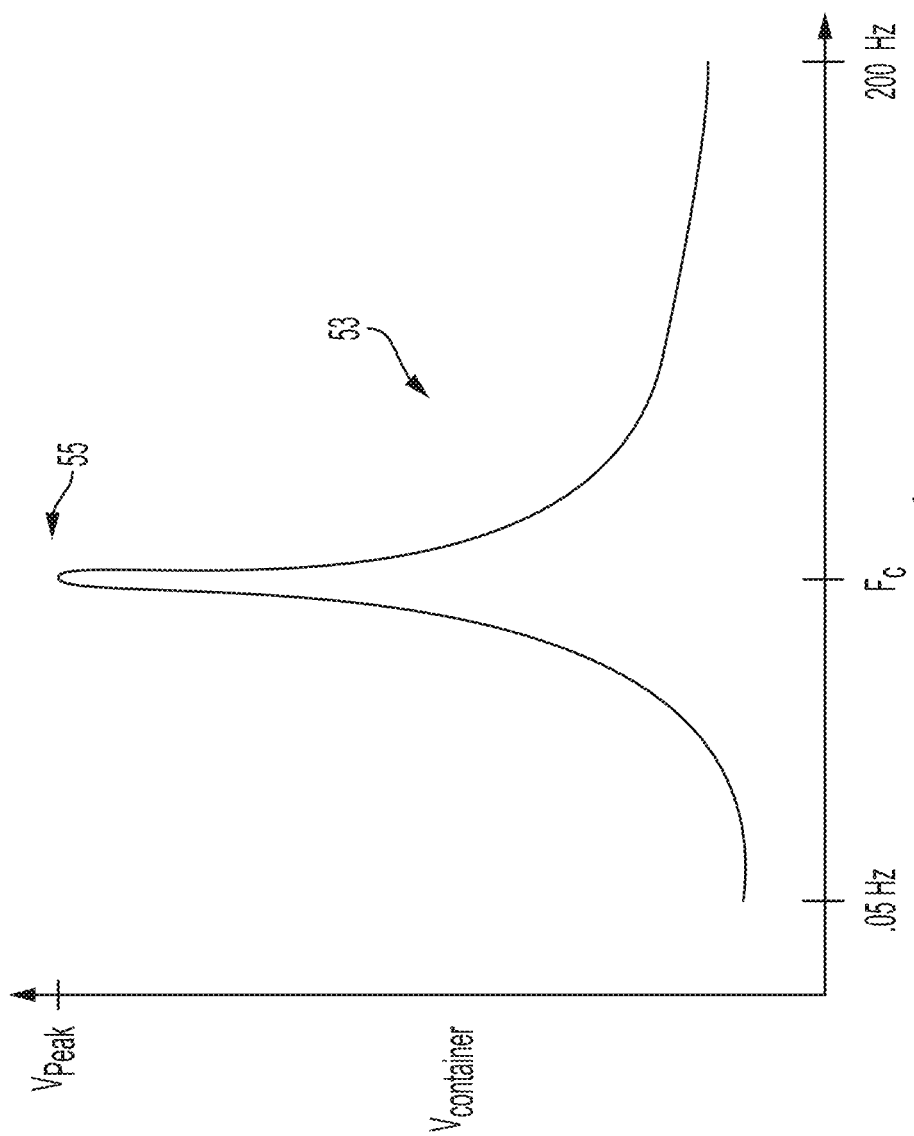
FIG. 8 shows an illustrative graphical representation of vibration vs frequency of a container in accordance with an aspect of the invention.

FIG. 8 shows a graphical illustration of vibration vs frequency of a container of objects in a system in accordance with aspects of the present invention. The relationship is shown at 53, and as shown at 55, a peak vibration of the container may exist at a frequency F(c) at which the container of objects appears to vibrate the most significantly ($V_{peak}$). Again, this information may be used to determine characteristics of the objects within the container, for example, total weight and/or total number of objects.

Figure 9:
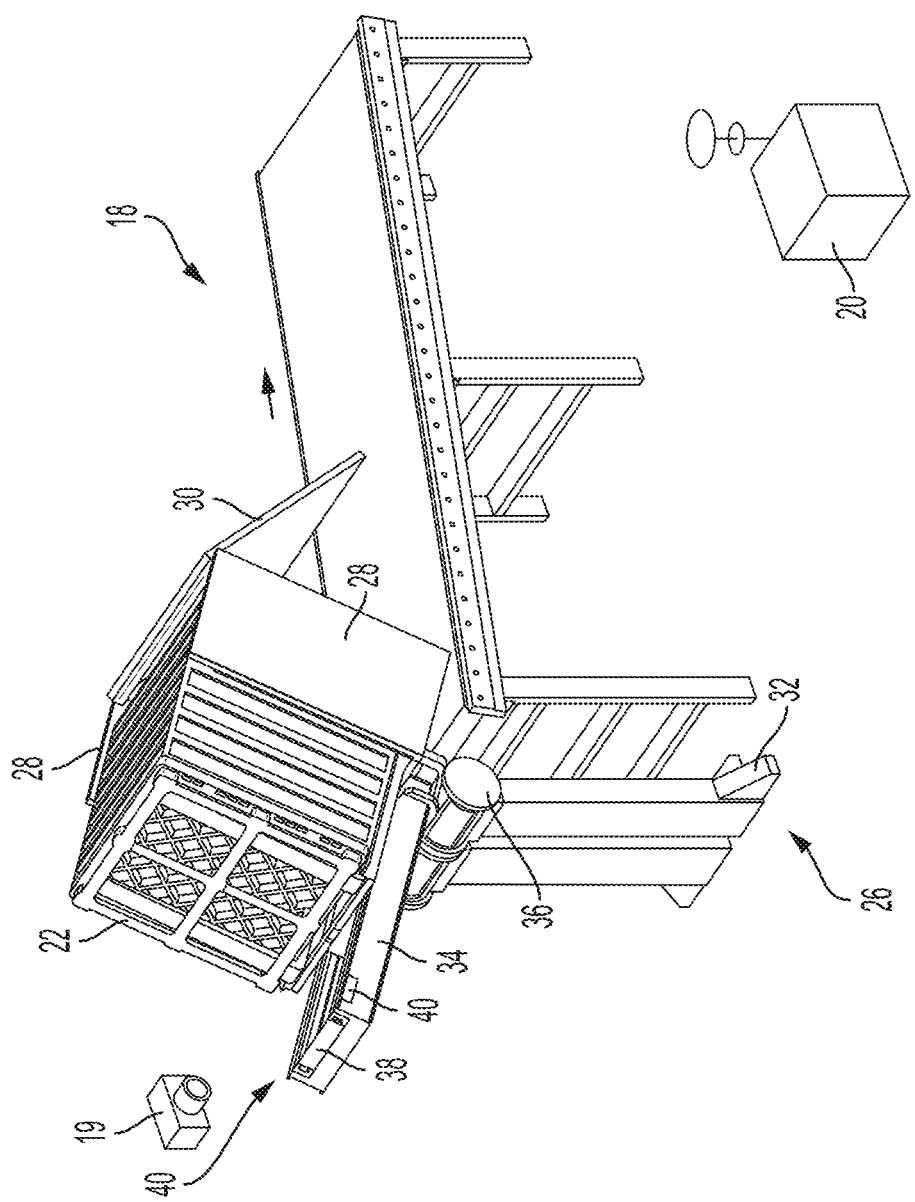
FIG. 9 shows an illustrative diagrammatic view of the system of FIG. 1 with the container handling system controlling disgorgement of objects from the container onto the conveyor system.
Figure 10A:
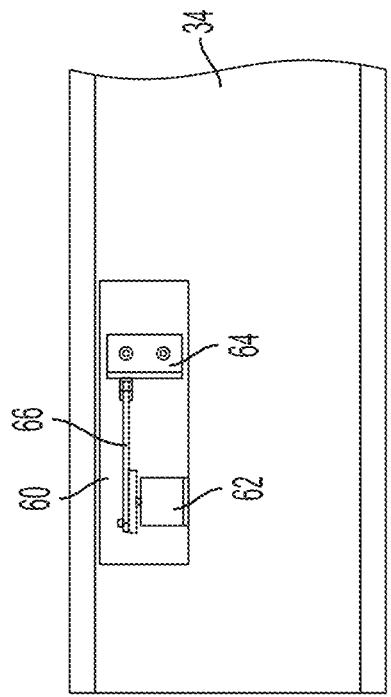
FIGS. 10A-10D show illustrative diagrammatic side views of a vibration actuator for use in a system in accordance with an aspect of the invention that includes a rotary actuator.
Figure 10B:
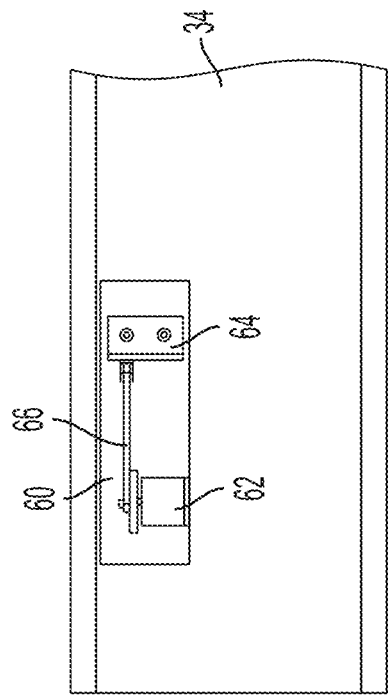
Figure 11A:
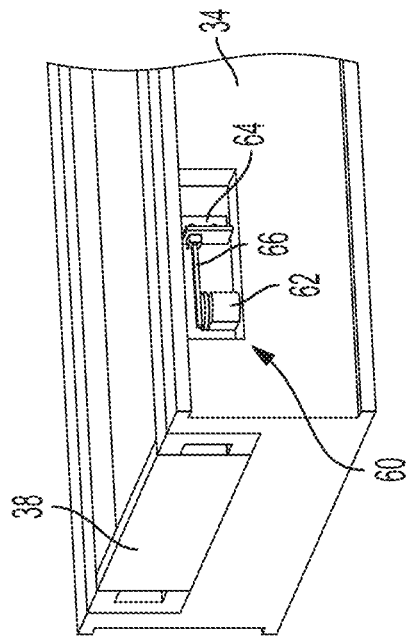
FIGS. 11A-11D show illustrative diagrammatic isometric views of the vibration actuator of FIGS. 10A-10D showing the central actuator.
Figure 11B:
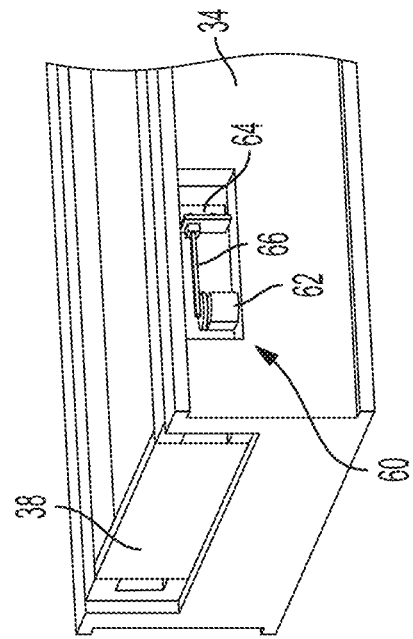
Figure 10C:
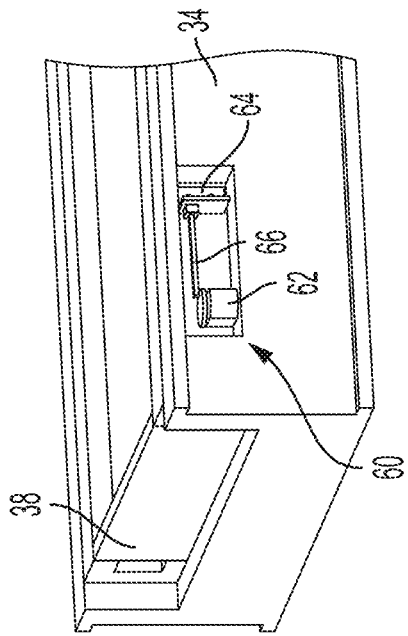
Figure 10D:
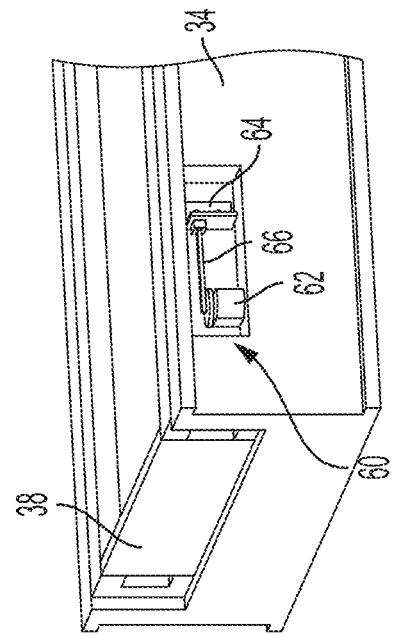
Figure 11C:
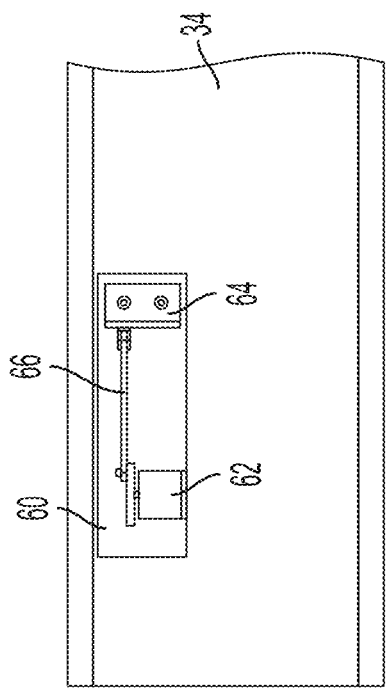
Figure 11D:
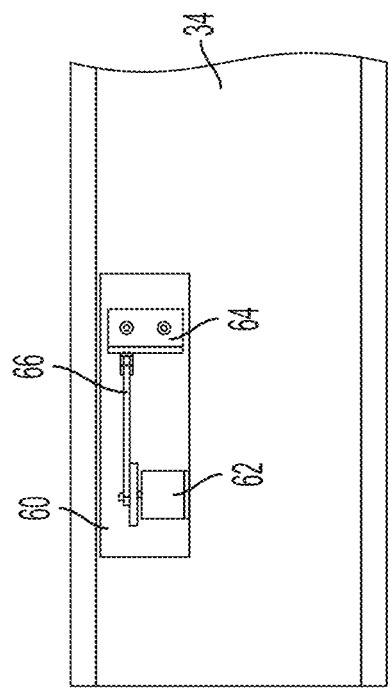
Figure 12A:
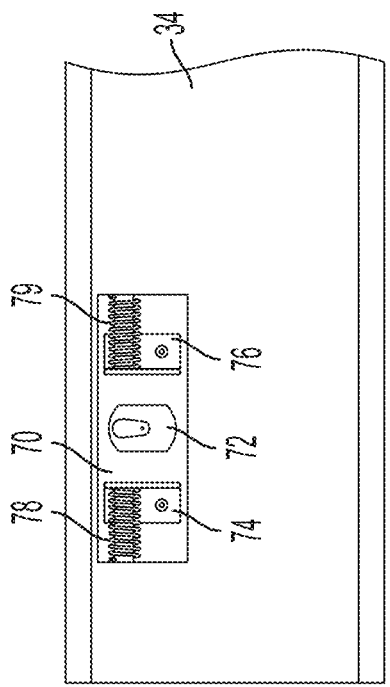
FIGS. 12A-12D show illustrative diagrammatic side views of a vibration actuator for use in a system in accordance with an aspect of the invention that includes a cam actuator.
Figure 12B:
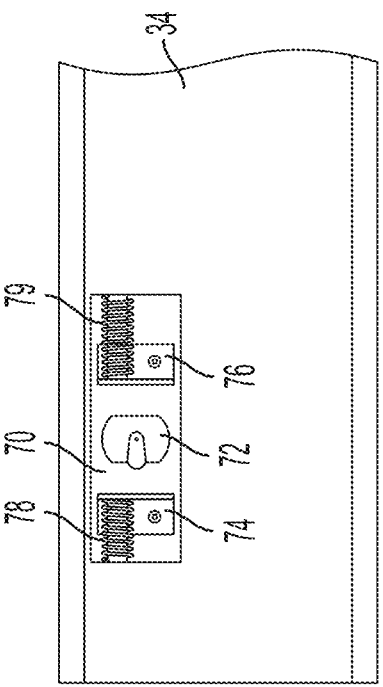
Figure 13A:
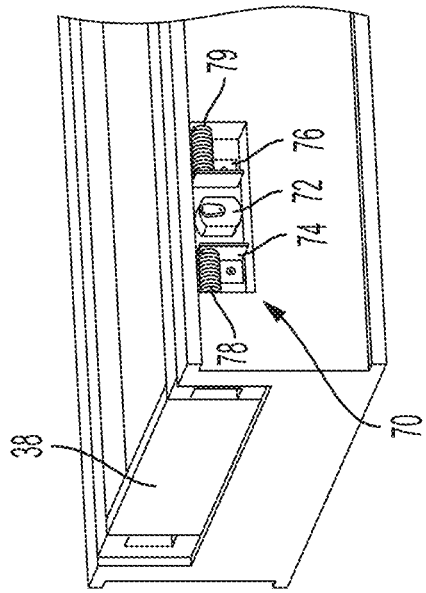
FIGS. 13A-13D show illustrative diagrammatic isometric views of the vibration actuator of FIGS. 12A-12D showing the central actuator.
Figure 13B:
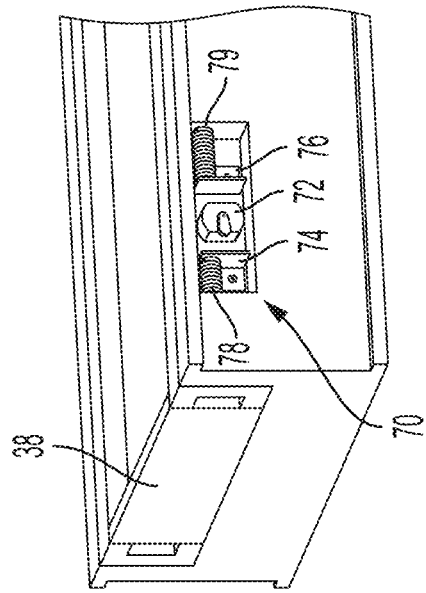
Figure 12C:
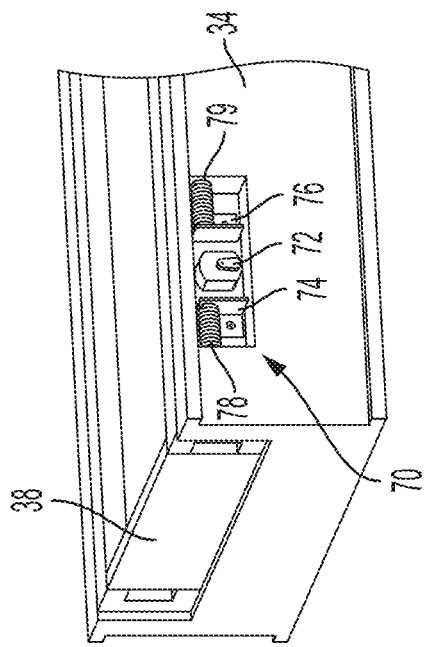
Figure 13C:
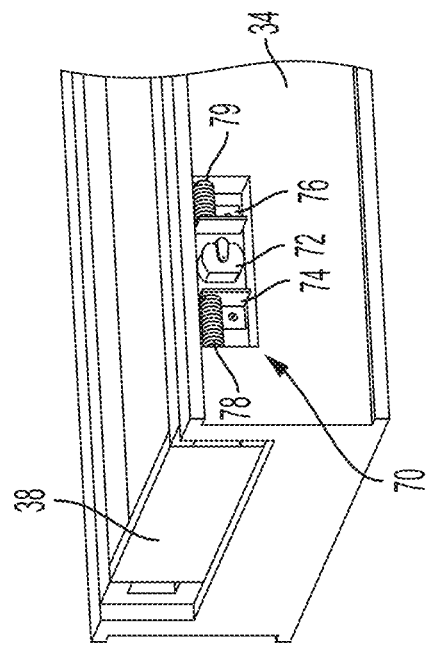
Figure 12D:
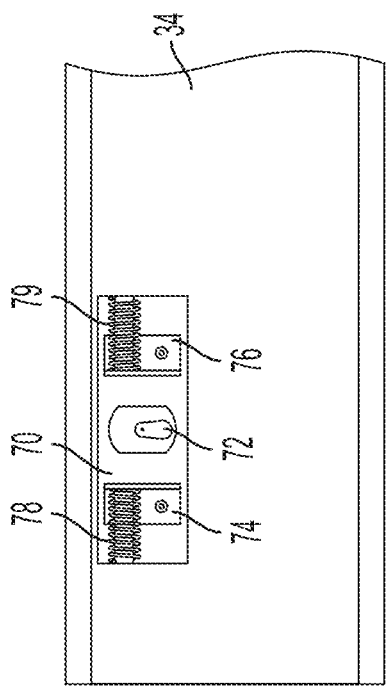
Figure 13D:
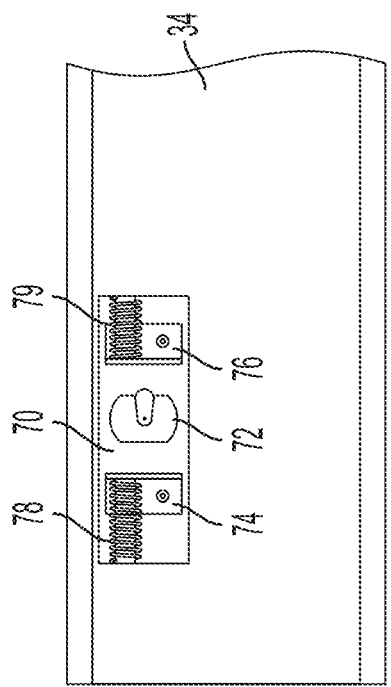

As shown in FIG. 9, the container handling system 26 including the base 32 and the lift arm 34, may then be used to lift the container past horizontal. Again, not only does the lift arm 34 lift the container upward (as shown in FIG. 3), the lift arm 34 is also rotatable by motor 36 to tip the container. When this happens, the hinged top swings open (or is actuated to open), and the pallet base 22 engages the bottom sides of the tongs 24 and is thereby held by the tongs 24. The container 14 is secured to the pallet base 22. In accordance with further aspects, the inner surface of the guide sides 28 may include stops 15 (e.g., on the insides of the guide sides as shown in FIG. 3) against which the container may rest when turned over. Again, the lifting motion and the rotating motion may be powered by hydraulic actuators or electric motors.

FIGS. 10A-10D show side views of a vibration actuator 60 in accordance with another aspect of the present invention, and FIGS. 11A-11D show isometric views of the vibration actuator 60 and the lift arm 34. The vibration actuator 60 may be used in place of the vibration actuator 40 of the prior aspect of the invention. The vibration actuator 60 includes a bracket 64 that is attached to the central actuator 38, as well as a rotating drive 62 that is attached to a linkage 66 that acts on the bracket 64. As the drive 62 rotates, the linkage 66 causes the bracket 64 (and thereby the central actuator 38) to move in a vibratory motion as discussed above, though the displacement over time would be more sinusoidal.

FIGS. 12A-12D show side views of a vibration actuator 70 in accordance with another aspect of the present invention, and FIGS. 13A-13D show isometric views of the vibration actuator 70 and the lift arm 34. The vibration actuator 70 may be used in place of the vibration actuator 40 of the aspect of FIGS. 1-6B. The vibration actuator 70 includes a rotating cam mechanism 72 that is attached with brackets 74, 76 to the central actuator 38. The vibration actuator 70 may further include springs 78, 79 that urge the brackets toward a central position against the action of the cam. As the cam 72 rotates, the brackets 74, 76 (and thereby the central actuator 38) are urged to the left (FIG. 12B), then to the right (FIG. 12D), which causes the central actuator 38 to move in a vibratory motion as discussed above, with a sinusoidal displacement over time.

In accordance with various aspects, the container handling system may include one or more (e.g., two or four) vibration actuators 40, 60, 70. For example, the system shown in FIG. 4 may include a vibration actuator on either side of the lift arm 34, and the two or more vibration actuators may operate in unison under the control of the one or more processing systems 20.

Figure 14A:
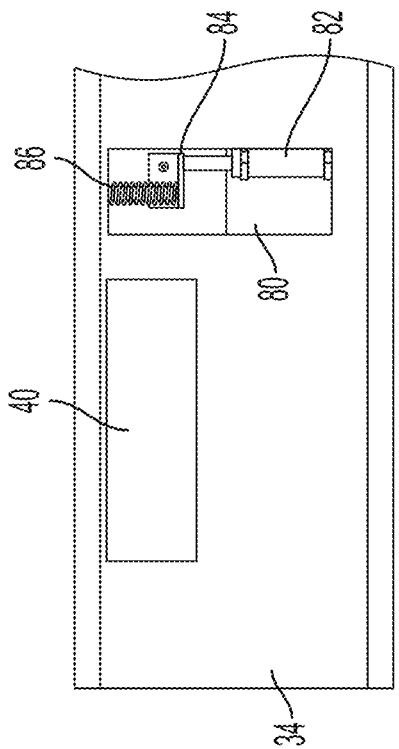
FIGS. 14A and 14B show illustrative diagrammatic side views of a vibration actuator for use in a system in accordance with an aspect of the invention that includes a vertical actuator.
Figure 14B:
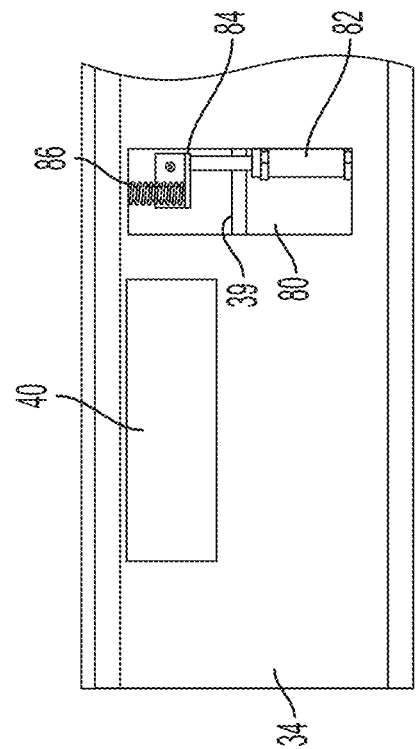
Figure 15A:
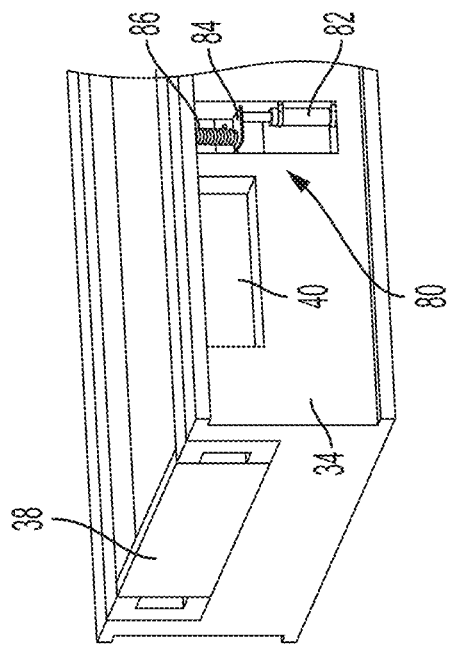
FIGS. 15A and 15B show illustrative diagrammatic isometric views of the vibration actuator of FIGS. 14A and 14B showing the central actuator.
Figure 15B:
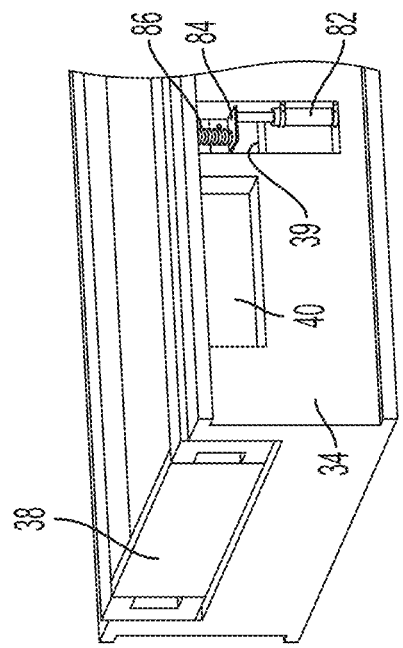

In accordance with a further aspect, the system may additionally include a vertical vibration actuator 80 as shown in FIGS. 14A-15B. FIGS. 14A and 14B show side views of a vertical vibration actuator 80 in accordance with an aspect of the present invention, and FIGS. 15A and 15B show isometric views of the vertical vibration actuator 80 and the lift arm 34. The vertical vibration actuator 80 includes a bracket 84 that is attached to the central actuator 38 (having a bottom 39), as well as a piston or solenoid 82 that acts on the bracket 84, and an optional return spring 86 that urges the piston or solenoid 82 to a return position similar to the vibration actuator 40 of FIGS. 5A-6B. The central actuator 38 is shown lifted in FIGS. 14B and 15B (showing the bottom 39 of the central actuator 38). In certain aspects, the piston or solenoid 82 may be reversibly activated. The system shown in FIGS. 14A-15B may include a vertical vibration actuator on either side of the lift arm 34; the two (or more) vertical vibration actuators may operate in unison under the control of the one or more processing systems 20. Systems of the invention may provide either or both horizontal and vertical motion, and when combined may be tuned to hop objects out of the container.

In accordance with certain aspects the system may tip to an angle that is any of: 1) sensed by shifting load inside the container with force sensors, visual sensors, or 3D sensors, or 2) learned automatically for a given application, by recording the angles that are too great where too many objects exit the container, or too little where nothing exits the container even when shook, and then executes binary search or other optimization to find the best angle, or 3) uses a pre-determined slope of incipient slip tuned by hand for a given application.

Figure 16:
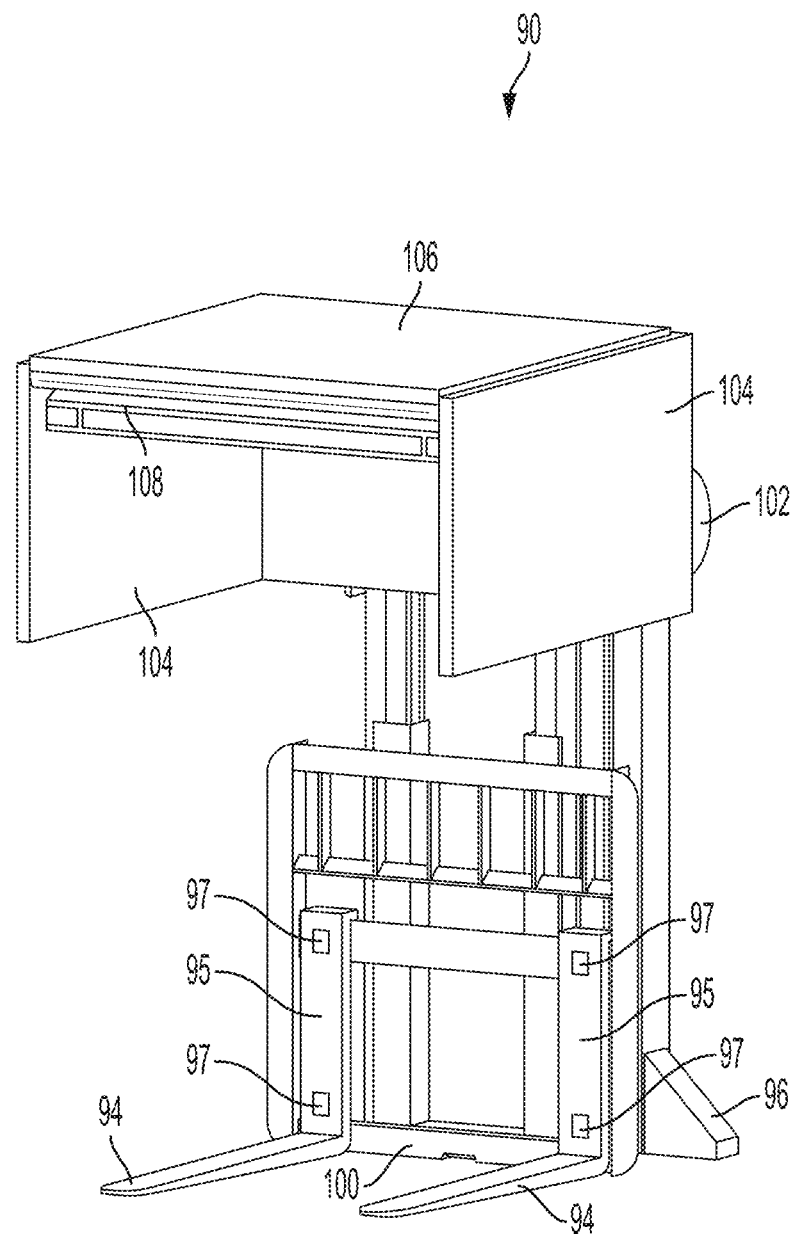
FIG. 16 shows an illustrative diagrammatic view of a container handling system in accordance with a further aspect of the invention that includes a force torque sensor and a perception system.
Figure 17:
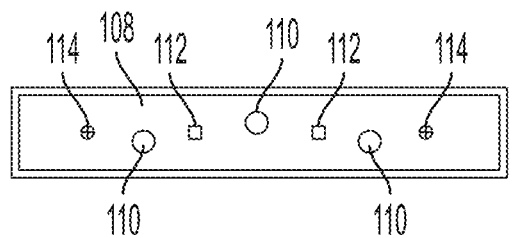
FIG. 17 shows an illustrative diagrammatic view of the perception system of FIG. 16.

FIG. 16 shows a container handling system 90 for use in a processing system 10 of FIGS. 1-4 that includes lift fork tongs 94 and a base 96. Similar to the system of FIGS. 1-4, the system 96 includes a lift arm 98 that includes a central actuator 100 as well as a control motor 102 that includes a force torque sensor for determining a weight of the container. The lift fork tongs 94 are attached to lift sections 95 that further include load cells or force torque sensors 93, that, when the container is lifted to be horizontal (e.g., as shown in FIG. 4), may be used to determine the total weight of the objects as well as the container and pallet base. Knowing the weight of the container and the pallet base, permits the system to determine the weight of the total set of the objects within the container. The system 96 further includes guide sides 104 and a hinged top 106, as well as an array 108 of sensors, cameras and/or detectors. As shown in FIG. 17, for example, the array 108 may include lights 110, cameras 112, and/or other motion sensors 114 (e.g., motion detectors), and these systems may be used together with the one or more processors 130 to detect any movement within the container.

Using such an array 108, the system may rotate the container from the position as shown in FIG. 4. The weight of the objects within the container may be determined by the force torque sensor (less the weight of the container itself and the lift arm) when the lift arm is not yet rotated to an angle at which any object within the container moves. The lift arm is then further rotated until any object within the container moves, and this angle is identified for the container as the incipient angle for that container of objects. In certain aspects, the lift arm may then be lowered slightly and the weight may then be determined.

Figure 18:
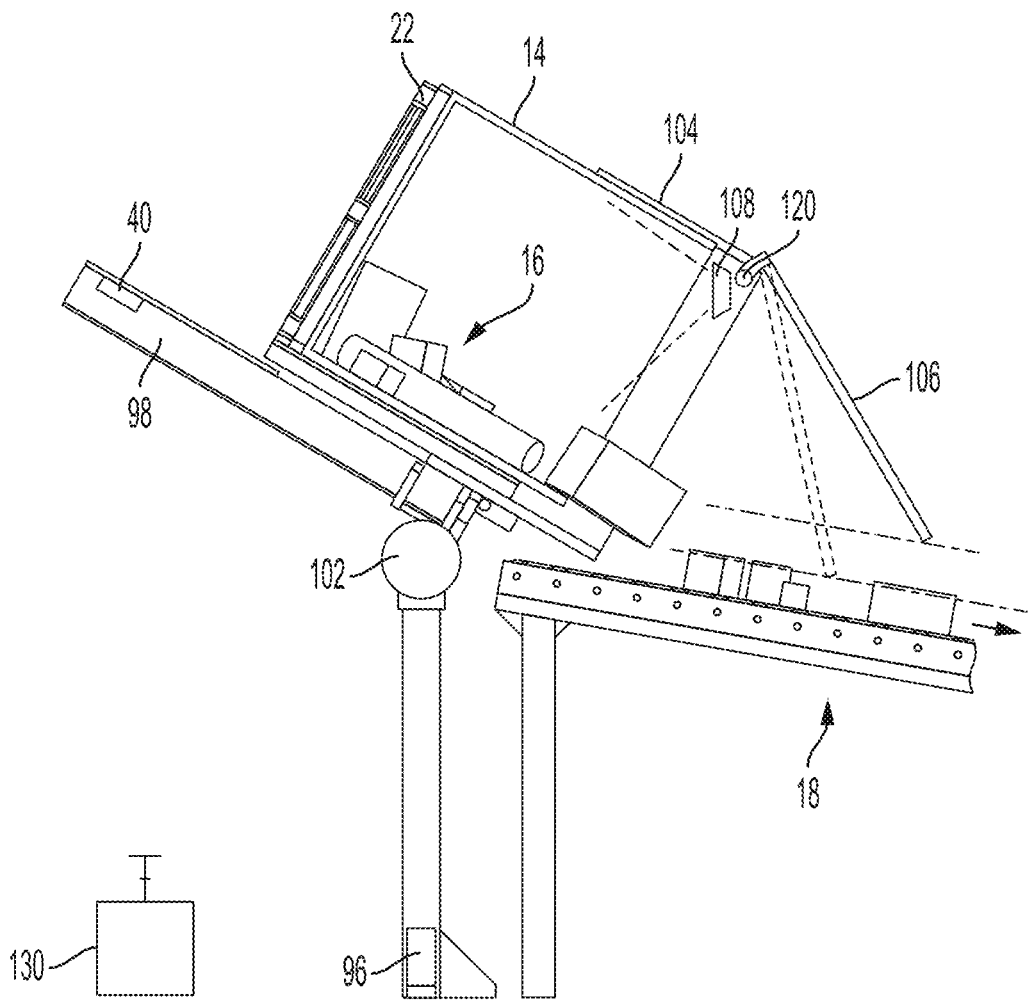
FIG. 18 shows an illustrative diagrammatic view of the container handling system of FIG. 16 disgorging objects onto a conveyor system.

With reference to FIG. 18, the lift arm 98 may similarly include one or two or more horizontal and/or vertical vibration actuators 40 for causing the central actuator to move (vibrate) with respect to the lift arm, thereby causing the objects 16 within the container to be disgorged at a controlled rate onto the conveyor system 18. The hinged top 106 may further include a motor actuator 120 that may be engaged to adjust the open angle of the top with respect to the container, to thereby control or limit the disgorgement of large objects or objects far above the lower side wall of the container as shown in the dashed lines of FIG. 18.

Figure 19A:
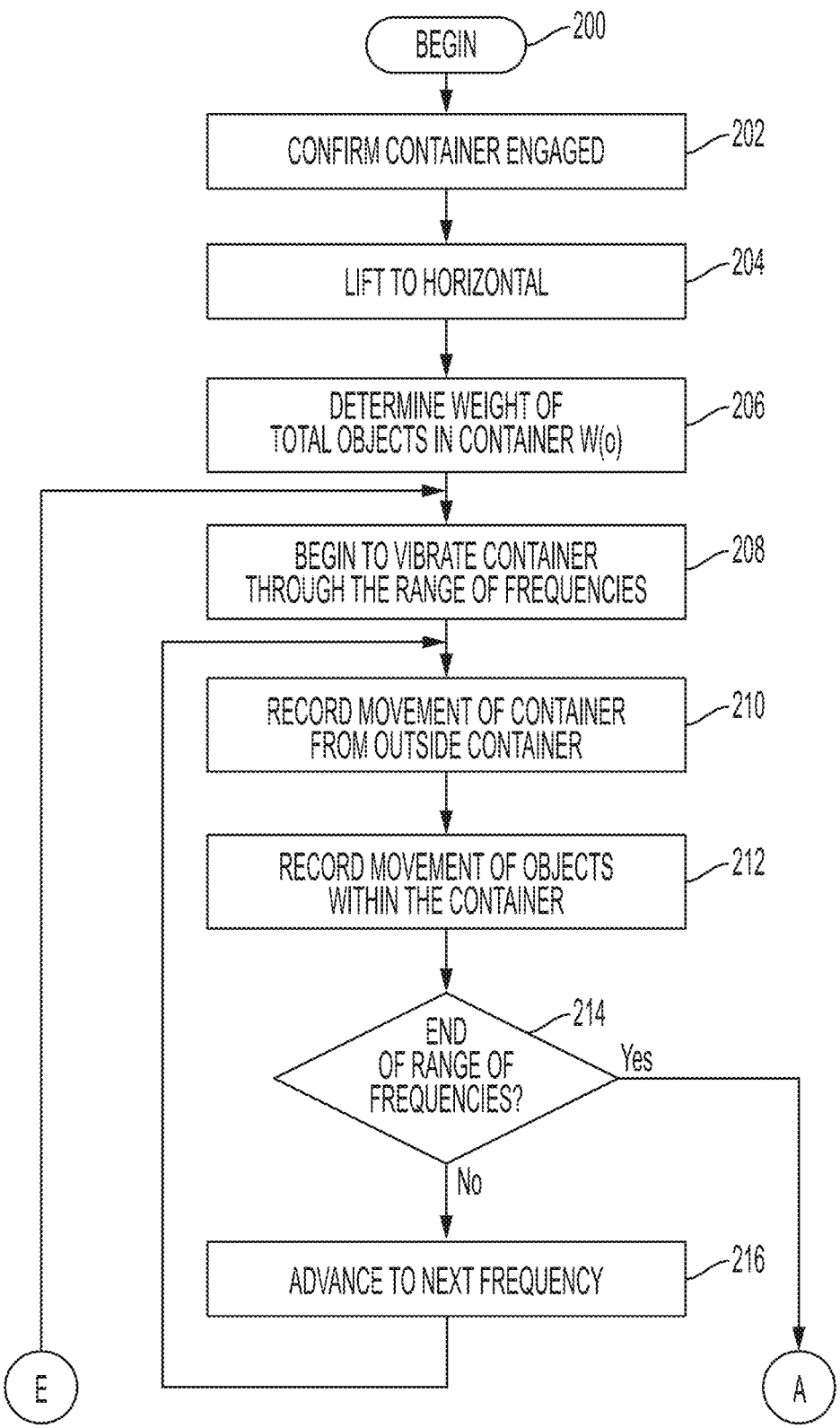
FIGS. 19A-19C show illustrative diagrammatic views of a disgorgement process in accordance with an aspect of the invention.
Figure 19B:
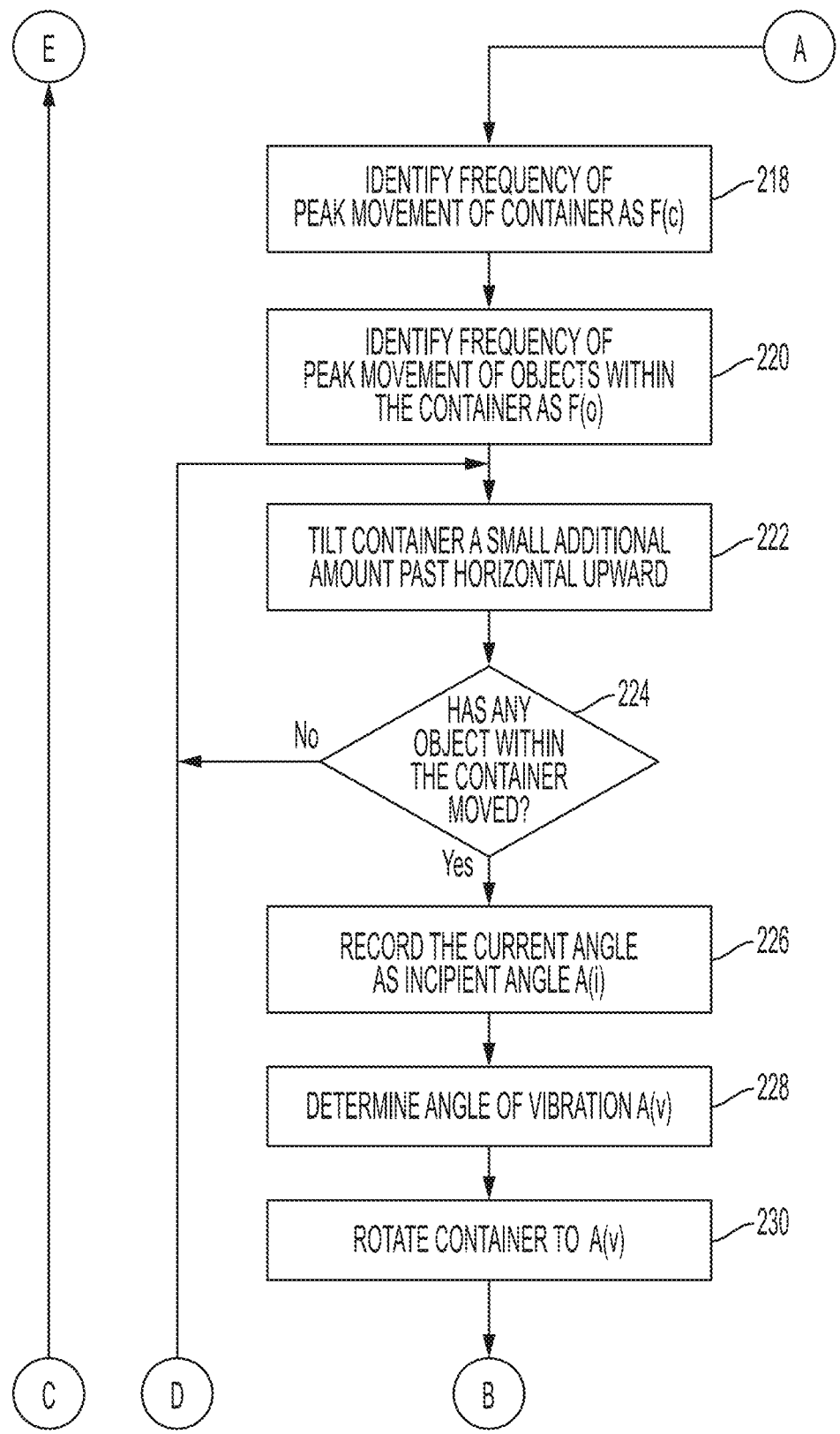
Figure 19C:
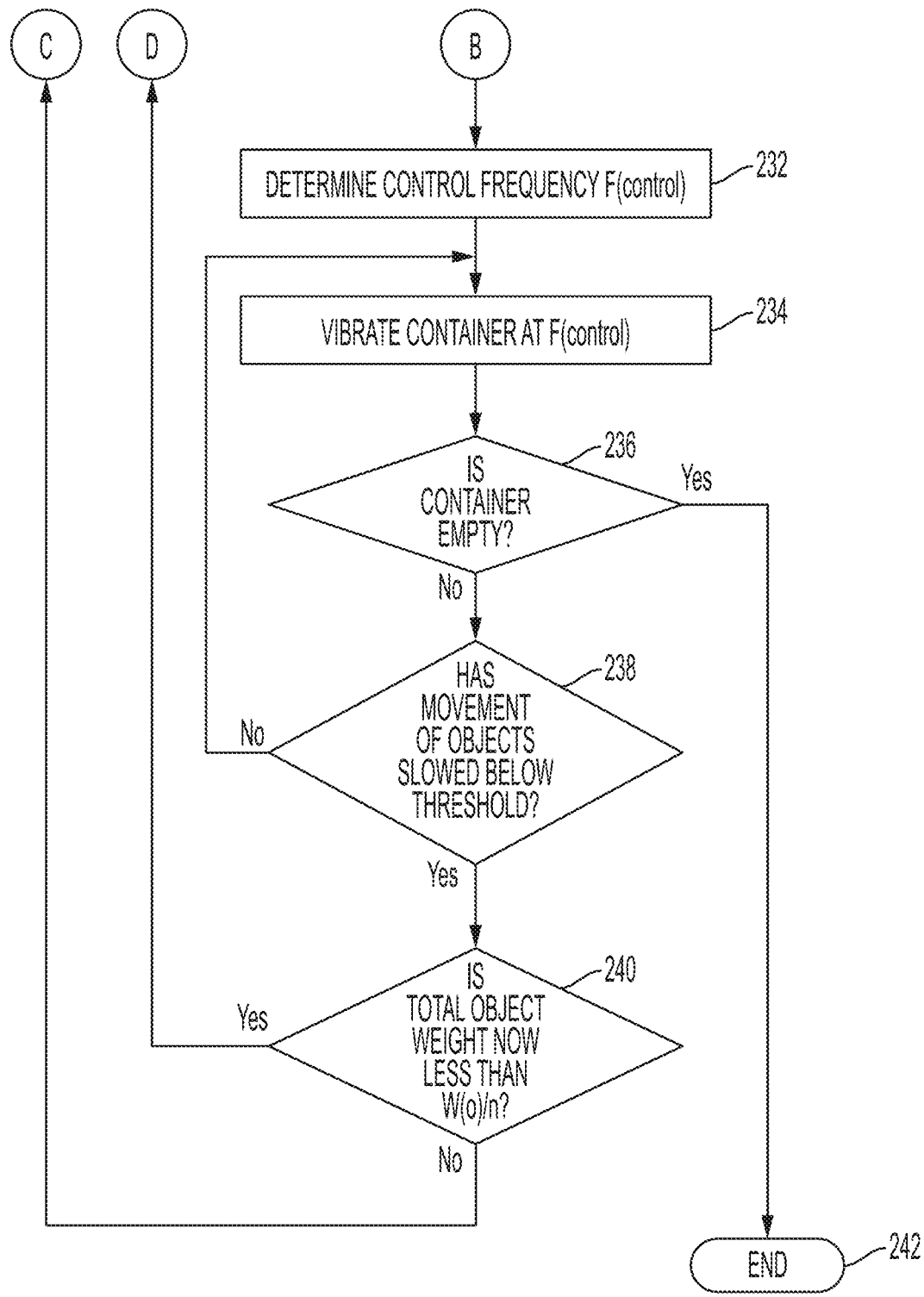

FIGS. 19A-19C show a processing method in accordance with an aspect of the present invention using the aspects and systems discussed herein. In particular, the system begins (step 200) and confirms that a container is engaged by the lift fork tongs (step 202). The container may be slid onto the tongs (e.g., by human personnel or by a lift truck). The system then lifts the container to horizontal, and may secure the hinged top from opening as discussed herein. The container may also be secured by a variety of means as discussed herein, including providing stops within the guide sides, and/or by providing lift fork tongs that engage the pallet base as discussed herein. The weight of the container (and objects and pallet base) W(o) is then determined by the load cells or force torque sensors on the lift sections or by the force torque sensor on the rotation motor that provides lift as also discussed herein (step 206).

The system may then begin to vibrate the container (as discussed herein) through a range of frequencies, e.g., 0.05 Hz to 200 Hz, (step 208). The system may then use, for example, any of a stationary camera, load cells or force torque sensors as discussed herein to record any movement of the container (step 210) as associated with the current frequency of vibration. The system may also record any movement of objects within the container (step 212), e.g., using a detection array 108 (step 212) as also associated with the current frequency of vibration. If the current frequency is not at the end of the range of frequencies (step 214), then the system advances the frequency to a next frequency in the range of frequencies (step 216), and the system returns to step 208 of vibrating at the changed frequency. The steps of 210, 212 and 214 are repeated until the system reaches the end of the range of frequencies (step 214) and the system advances to an analysis mode.

In the analysis mode and with further reference to FIG. 19B, the system identifies a frequency associated with peak movement of the container as F(c) (step 218) and identifies a frequency of peak movement of objects within the container as F(o) (step 220). The system will then further tilt the container an additional amount (past horizontal) (step 222), and then determine whether any object within the container has moved (step 224). If no object has yet moved, the process returns to steps 222 and 224, each time slightly increasing the angle of the container until an object moves. Once an object within the container does move, the system will record the current angle of the container as the incipient angle A(i) for that container of objects (step 226). The system will then determine an angle of vibration A(v) (step 228) to be used when vibrating the container, which is also referred to herein as the disgorgement angle. The angle of vibration A(v) may be provided in an aspect by subtracting a small amount (e.g., 1-5 degrees) from the incipient angle A(i) (moving closer to horizontal). Such may be provided as A(v)=A(i)−n degrees (and n may be zero). In accordance with further aspects, the angle of vibration A(v) may be further taken into account the determined weight of object in the container W(o). For example, for heavier loads within a container, the angle of vibration A(v) may be increased. Such may be provided, for example as A(v)=A(i)−n degrees+ (m degrees x a weight factor). In accordance with further aspects, one or both of the frequencies of peak movement of the container F(c) and peak movement of the objects F(o) may further be taken into account. In any event, the system then rotates the container to the angle of vibration A(v) (step 230).

With further reference to FIG. 19C, the system may then determine a control frequency F(control) at which the central actuator will be vibrated (step 232). In certain aspects, this may be the frequency at which the container showed peak movement F(c). In such aspects, therefore, F(control) =F(c). In other aspects, the control frequency may be the frequency at which the objects within the container showed peak movement F(o). In such aspects, therefore, F(control) =F(o). Because objects will be continuously disgorged from the container however, F(c) will change over time. In further aspects, particularly where F(c) is significantly different than F(o), the control frequency may be a function of both F(c) and F(o). In such aspects, for example, F(control)=|F(c)−F(o)|. Such a system would take into account the frequency of peak vibration of the container as well as the objects (when full in the container).

The system may then vibrate the container at the control frequency F(control) (step 234). The system may continue until the container is empty. In particular, the system will then determine whether the container is empty (e.g., using the detection system 108) (step 236). If so, the process ends (step 242). If not, the system then determines whether movement of objects out of the container has slowed beyond a threshold (step 238), of for example, one object per 10 seconds. If not, the system returns to step 234 and the process continues until the container is empty. If the movement of objects out of the container has slowed beyond the threshold (step 238), then the system will determine whether the total weight of the container (via the load cells or force torque sensors) is significantly lower (e.g., below by a factor) than the initial weight of the objects in the container W(o) from step 206. For example, the factor may be ¼. In such a system, if the current weight of the container is less than ¼ of the weight when the process began, then the system will return to step 222 and slightly tilt the container further until a new incipient angle is determined (as discussed above). If however, the current weight of the container is not less than ¼ of the weight when the process began, then the system will return to step 208 and re-analyze the characteristics of the system (as discussed above). In this way, if movement slows, the system may simply increase the angle if not too many objects remain in the container, or the system may re-assess the parameters of the system if many objects remain in the container.

Figure 20:
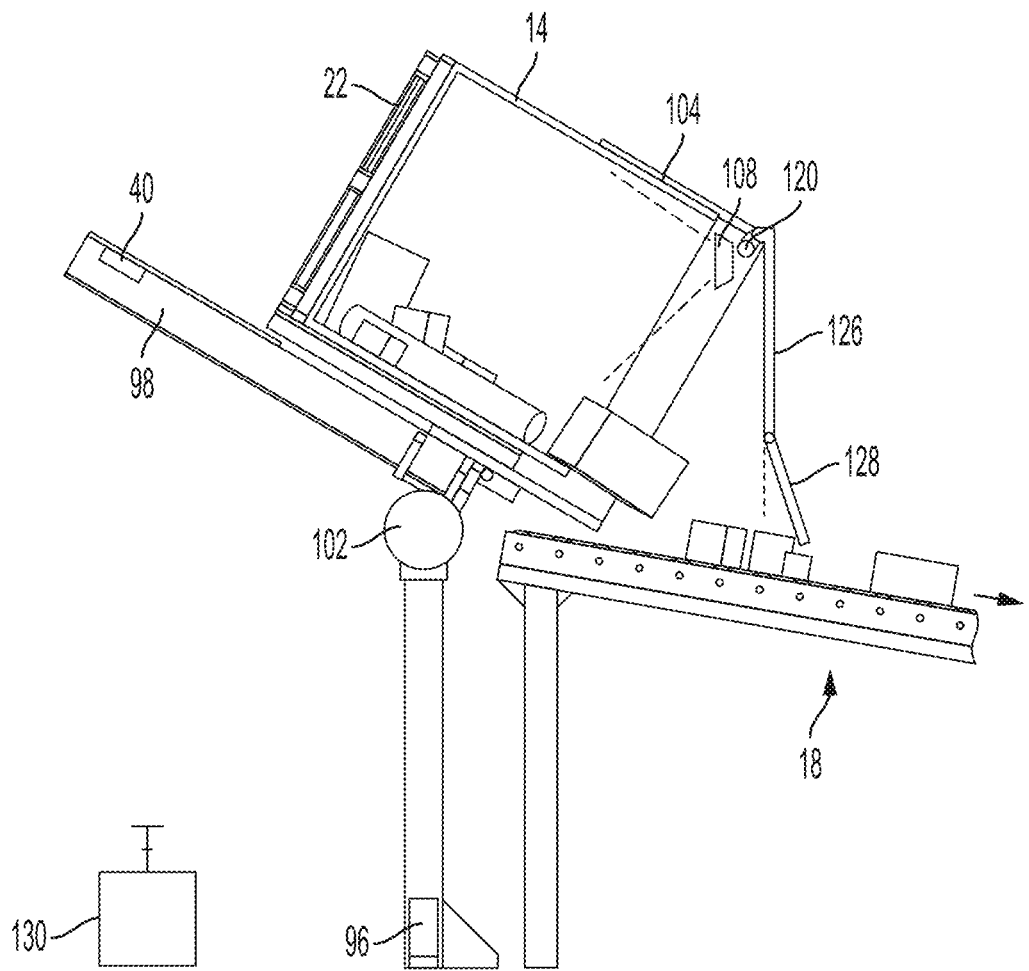
FIG. 20 shows an illustrative diagrammatic view of a container handling system in accordance with a further aspect of the invention that includes a hinged top with separately hinged sections.

As discussed above, in accordance with further aspects, the system includes a hinged top (or flap) to prevent toppling and further limits the flow. A spring-loaded retaining flap, which is mounted to an open frame attached to the lift mast, limits package flow and prevents the top-most packages from toppling onto the conveyor belt, and the flap may have more than one segment joined by joints or hinges so as to allow lighter packages to pass through and not get stuck behind the flap. In accordance with a further aspect as shown in FIG. 20 (in which like elements bear like reference numerals to the system of FIG. 18), the hinged top may further be provided in sections 126, 128, where lower sections (e.g., 128), are further hinged to permit movement away from the container, optionally against a retention force that urges the sections 126, 128 to align.

In accordance with certain aspects, the system may alternate active vibration with non-vibration. In other words, the system may apply the vibration to the container for a limited time, e.g., one to five seconds, and then pause for a short time, e.g., one to five or ten seconds prior to re-applying the active vibration. This may further permit objects to become singulated on a conveyor. The speed of movement of the conveyor may also be controlled responsive to sensed movement of objects from the conveyor (e.g., based on changing weight of the conveyor as determined by load cells of force torque sensors 23, 36, 97 and/or detection systems 19, 108).

In accordance with various aspects, therefore, systems of the invention vibrates the firmly held container at or near the slope of incipient slip, by any of the following means 1) a motor converts rotary motion to an oscillating linear motion with linkage bars to a rigid retaining mechanism for the container, resulting in a direct mechanical transmission; or 2) a motor drives a spring in series with the container retention mechanism; or 3) a motor drives a spring with a damper in parallel to the spring; or 4) a motor drives a variable stiffness spring, where the stiffness is tuned to the load; or 5) where the frequency and/or the stiffness of the spring-damper system are tuned so as to achieve a vibration near the resonant frequency of the mechanical system, in order to reduce the work of the motor; or 6) where the achieved lateral motion profile is an approximated sawtooth—so that the container wall spends most of the time in descent and being stationary with respect to the contents, and thus subject to static friction, while during incline the wall moves quickly up, temporarily overcoming static friction, and thus the items slipping over the container wall. Alternatively, instead of or along with vibrating the container itself, the system may vibrate a flow-restricting chute that holds back the contents, but that itself vibrates in an oscillatory manner to gradually draw the contents out of the container.

Figure 21:
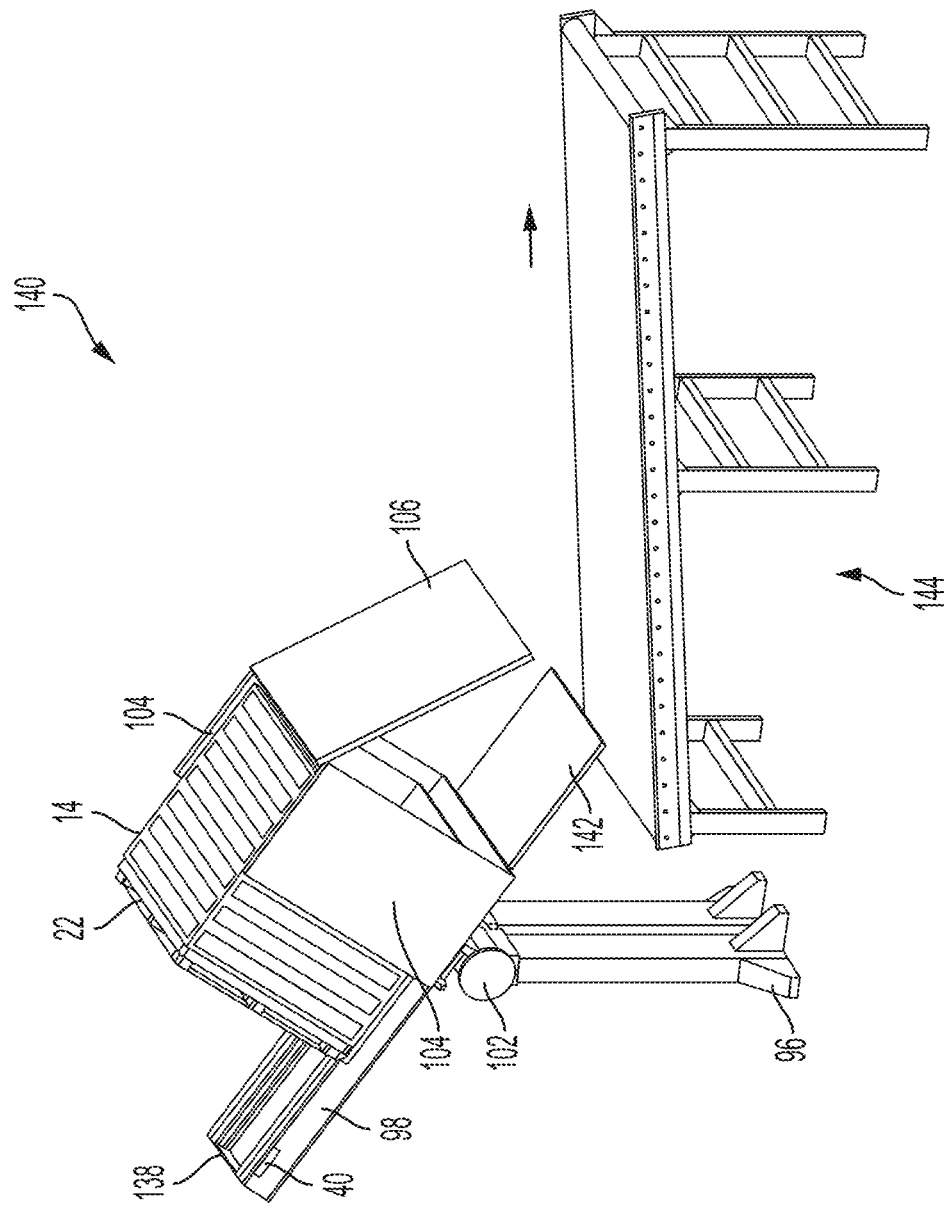
FIG. 21 shows an illustrative diagrammatic view of a container handling system in accordance with a further aspect of the invention that includes a motion controlled chute.
Figure 22:
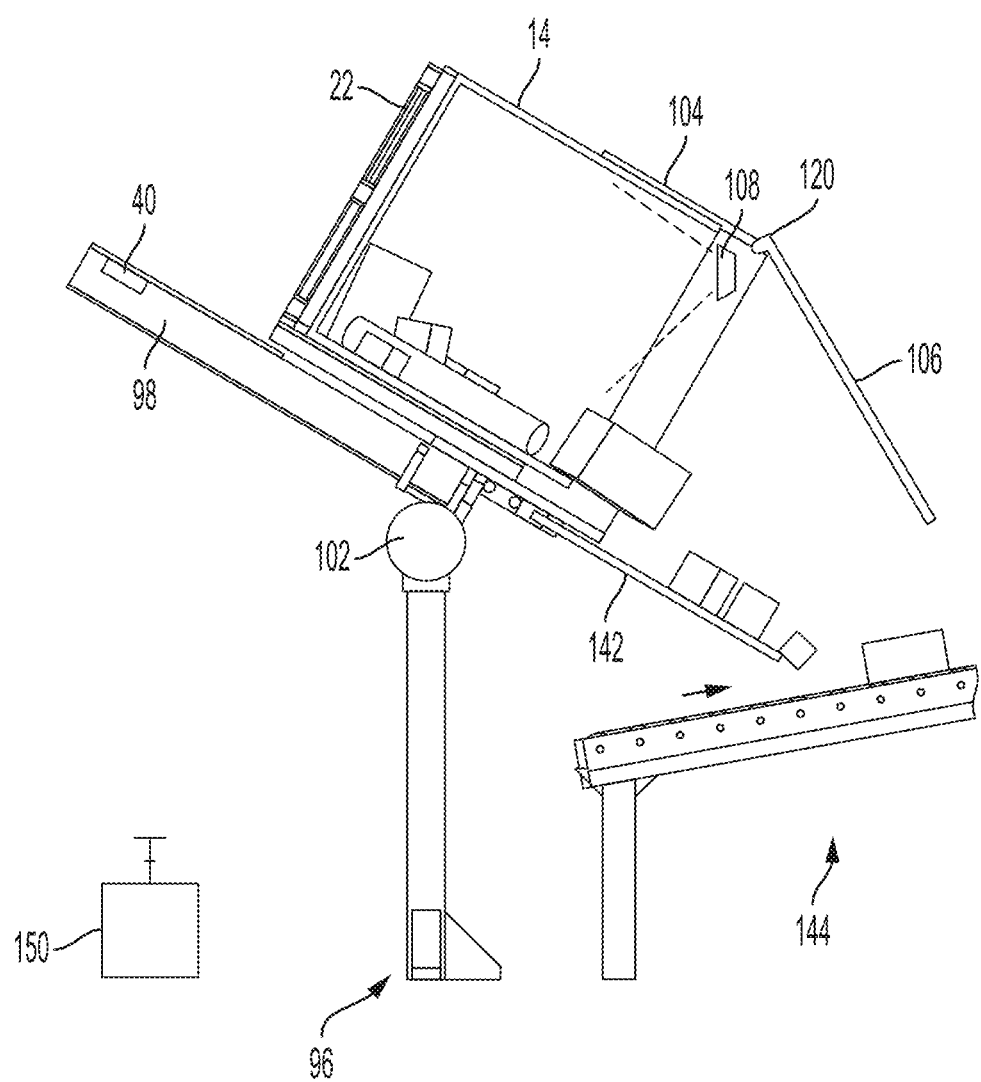
FIG. 22 shows an illustrative diagrammatic side view of the system of FIG. 21 disgorging objects onto a conveyor system.

FIGS. 21 and 22 show a processing system 140 in accordance with a further aspect of the present invention that further includes a chute 142 that is connected to the central actuator 138 similar to the central actuator 38 of FIGS. 1-4. The chute 142 may be used to further separate objects prior to dropping the objects (as shown in FIG. 19) onto a conveyor 144, and the conveyor 144 may be flat or angled either upward or downward.

Figure 23:
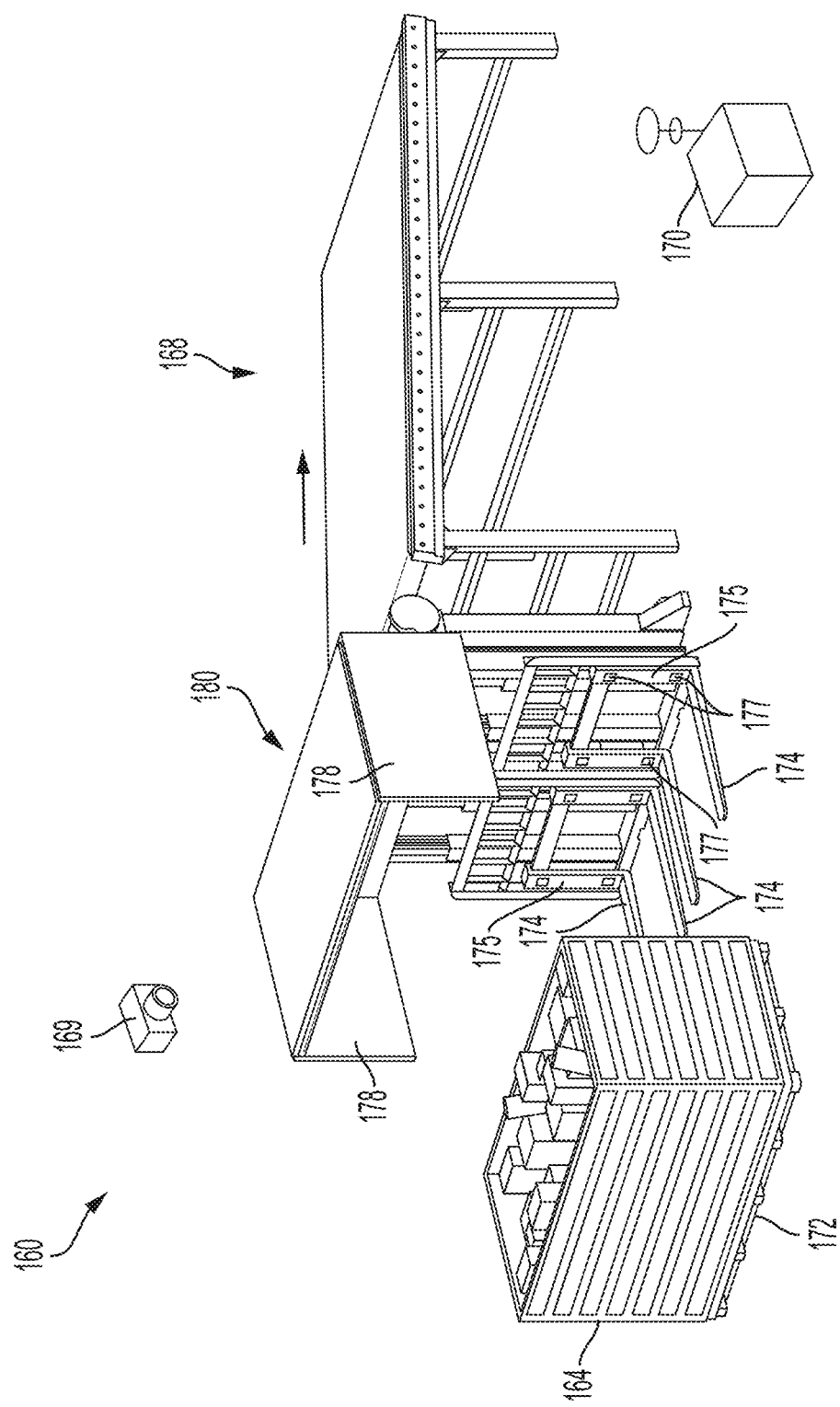
FIG. 23 shows an illustrative diagrammatic view of a container handling system in accordance with a further aspect of the invention that includes accommodates a double wide container.

Further, for bulk containers, the system includes a forklift that raises bulk containers of various sizes to the area of discharge for items, or may include a double-wide forklift to accommodate double-wide pallets. FIG. 23, for example, shows a processing system 160 that includes a double-wide container system 162 that may receive a double-wide container 164 containing objects 166, and lift and dump the objects onto a conveyor system 168, as well as a camera or other motion detection system 169, under the control of one or more processing systems as discussed above. In particular, the double-wide container 164 may include a double-wide pallet base 172 that may receive lift forks tongs 174 of a container handling system 166 of an aspect of the present invention. Again, the lift fork tongs 174 are maintained slightly off the floor (ground) so that the pallet base 172 may be slid onto the tongs 174. Alternatively, the tongs 174 may be angled on the bottom such that the free ends of the tongs rest above the floor. The container handling system 166 includes guide sides 178 as well as a hinged top 180.

In accordance with further aspects, the conveyor 18, 144, 168 may be a belted or cleated conveyor, and may be actively controlled to move contents out of the way as more items are disgorged from the container. Additionally, tension on the conveyor is monitored so as not to overly force items that are jammed.

Those skilled in the art will appreciate that numerous modifications and variations may be made to the above disclosed embodiments without departing from the spirit and scope of the present invention.

What is claimed is:

1. A method of controlling disgorgement of objects, said method comprising:
   lifting a container that contains objects to be disgorged;
   rotating the container to a first disgorgement angle;
   capturing movement image data regarding any movement of objects within the container;
   imparting vibrational movement to the container at a first frequency; and
   adjusting any of the first disgorgement angle and the first frequency responsive to the movement image data such that said objects are disgorged from the container at a controlled rate of disgorgement.

2. The method of claim 1, wherein the adjusting any of the first disgorgement angle and the first frequency responsive to the movement image data involves adjusting the first disgorgement angle to a second disgorgement angle.

3. The method of claim 1, wherein the adjusting any of the first disgorgement angle and the first frequency responsive to the movement image data involves adjusting the first frequency to a second frequency.

4. The method of claim 1, wherein the adjusting any of the first disgorgement angle and the first frequency responsive to the movement image data involves adjusting the first frequency over a range of frequencies.

5. The method of claim 1, wherein the capturing movement image data includes capturing data regarding movement of objects exiting the container.

6. The method of claim 1, wherein the objects are non-homogeneous.

7. The method of claim 6, wherein the objects vary in size by at least 1000%.

8. The method of claim 6, wherein the objects vary in volume from about 9 cubic inches to about 9 cubic feet.

9. The method of claim 6, wherein the objects vary in weight by at least 500%.

10. The method of claim 6, wherein the objects vary in weight from about 5 ounces to about 20 lbs.

11. The method of claim 6, wherein the first disgorgement angle is no greater than an incipient angle at which at least one object in the container overcomes a force of friction between the object and the container and begins to move.

12. The method of claim 6, wherein the first disgorgement angle is equal to the incipient angle.

13. The method of claim 6, wherein the first disgorgement angle is within 20 degrees of the incipient angle.

14. The method of claim 6, wherein the first disgorgement angle is within 10 degrees of the incipient angle.

15. The method of claim 6, wherein the first disgorgement angle is within 5 degrees of the incipient angle.

16. A method of controlling disgorgement of objects, said method comprising:
    rotating a container to a first rotational position;
    capturing movement image data regarding any movement of objects within the container;
    imparting vibrational movement to the container over a range of frequencies; and
    identifying a selected frequency at which to impart vibrational movement to the container responsive to the movement image data such that said objects are disgorged from the container at a controlled rate of disgorgement.

17. The method of claim 16, wherein the method further includes adjusting the selected frequency to a further selected frequency responsive to the movement image data.

18. The method of claim 16, wherein the method further includes identifying a selected disgorgement angle at which to rotate the container responsive to the movement image data.

19. The method of claim 18, wherein the method further includes adjusting the selected disgorgement angle to a further selected disgorgement angle.

20. The method of claim 19, wherein the selected disgorgement angle is no greater than an incipient angle at which at least one object in the container overcomes a force of friction between the object and the container and begins to move.

21. The method of claim 20, wherein the selected disgorgement angle is equal to an incipient angle.

22. The method of claim 20, wherein the selected disgorgement angle is within 20 degrees of the incipient angle.

23. The method of claim 20, wherein the first disgorgement angle is within 10 degrees of the incipient angle.

24. The method of claim 20, wherein the first disgorgement angle is within 5 degrees of the incipient angle.

25. The method of claim 16, wherein the capturing movement image data includes capturing data regarding movement of objects exiting the container.

26. The method of claim 16, wherein the objects are non-homogeneous.

27. The method of claim 26, wherein the objects vary in size by at least 1000%.

28. The method of claim 26, wherein the objects vary in volume from about 9 cubic inches to about 9 cubic feet.

29. The method of claim 26, wherein the objects vary in weight by at least 500%.

30. The method of claim 26, wherein the objects vary in weight from about 5 ounces to about 20 lbs.

* * * * *